US011418829B2

(12) United States Patent
Depies et al.

(10) Patent No.: US 11,418,829 B2
(45) Date of Patent: *Aug. 16, 2022

(54) METHOD AND SYSTEM FOR VIEWING SPORTS CONTENT WITHIN A VIRTUAL REALITY ENVIRONMENT

(71) Applicant: DIRECTV, LLC, El Segundo, CA (US)

(72) Inventors: Michael E. Depies, El Segundo, CA (US); Vikash Sharma, Marina Del Rey, CA (US); Aaron L. Goldstein, Los Angeles, CA (US); Charles W. Beeson, La Mirada, CA (US)

(73) Assignee: DIRECTV, LLC, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/398,421

(22) Filed: Aug. 10, 2021

(65) Prior Publication Data

US 2021/0368227 A1 Nov. 25, 2021

Related U.S. Application Data

(63) Continuation of application No. 16/556,712, filed on Aug. 30, 2019, now Pat. No. 11,115,701, which is a
(Continued)

(51) Int. Cl.
*H04N 21/41* (2011.01)
*G02B 27/01* (2006.01)
(Continued)

(52) U.S. Cl.
CPC ... *H04N 21/41265* (2020.08); *G02B 27/0093* (2013.01); *G02B 27/017* (2013.01);
(Continued)

(58) Field of Classification Search
CPC .......... H04N 21/4126; H04N 21/4316; H04N 21/478; H04N 21/4821; H04N 21/21805;
(Continued)

(56) References Cited

U.S. PATENT DOCUMENTS 9,298,283 B1 3/2016 Lin et al.
9,363,569 B1 6/2016 van Hoff et al.
(Continued)

OTHER PUBLICATIONS

United States Patent and Trademark Office, "Non-final Office Action," issued in connection with U.S. Appl. No. 15/069,723, dated Mar. 22, 2017, 11 pages.
(Continued)

*Primary Examiner* — Nicholas T Corbo
(74) *Attorney, Agent, or Firm* — Hanley, Flight & Zimmerman, LLC

(57) ABSTRACT

A virtual reality (VR) system including a head mounted display (HMD), a sensor or input device, and options, selection, and display modules. The HMD displays a VR environment including sports content of a live game, a prerecorded game, or a sports channel. The options module generates an options signal to show viewing options in the VR environment. The viewing options define viewing aspects for viewing the sports content within the VR environment. The sensor or input device generates signals based on detection of movement of the HMD, movement of an eyeball of a user, user voice communication, or user contact with the input device. The selection module, based on the signals: selects the sports content and a viewing option; and generates a selection signal. The display module displays the sports content in the VR environment based on the selection signal.

20 Claims, 18 Drawing Sheets

Related U.S. Application Data continuation of application No. 15/069,723, filed on Mar. 14, 2016, now Pat. No. 10,412,438.

(51) Int. Cl.

| | |
|---|---|
| *H04N 21/482* | (2011.01) |
| *H04N 21/431* | (2011.01) |
| *H04N 21/478* | (2011.01) |
| *G06F 3/01* | (2006.01) |
| *G02B 27/00* | (2006.01) |
| *G06F 1/16* | (2006.01) |
| *G06F 3/048* | (2013.01) |
| *G06T 19/00* | (2011.01) |
| *G10L 15/26* | (2006.01) |
| *H04N 21/218* | (2011.01) |

(52) U.S. Cl.
CPC .............. *G06F 1/163* (2013.01); *G06F 3/011* (2013.01); *G06F 3/012* (2013.01); *G06F 3/013* (2013.01); *G06F 3/048* (2013.01); *G06T 19/006* (2013.01); *G10L 15/26* (2013.01); *H04N 21/4316* (2013.01); *H04N 21/478* (2013.01); *H04N 21/4821* (2013.01); *G02B 2027/0138* (2013.01); *H04N 21/21805* (2013.01)

(58) Field of Classification Search
CPC ... G02B 27/0093; G02B 27/017; G06F 1/163; G06F 3/011; G06F 3/012; G06F 3/013; G06F 3/048; G06T 19/006; G10L 15/26
See application file for complete search history.

(56) References Cited

U.S. PATENT DOCUMENTS

| | | | |
|---|---|---|---|
| 10,412,438 | B2 | 9/2019 | Depies et al. |
| 11,115,701 | B2 | 9/2021 | Depies et al. |
| 2004/0060061 | A1 | 3/2004 | Parker |
| 2008/0276178 | A1 | 11/2008 | Fadell et al. |
| 2013/0093897 | A1 | 4/2013 | Fan et al. |
| 2014/0229996 | A1 | 8/2014 | Ellis et al. |
| 2016/0150212 | A1 | 5/2016 | Moura et al. |
| 2016/0227190 | A1 | 8/2016 | Cole et al. |
| 2016/0364198 | A1 | 12/2016 | Song et al. |

OTHER PUBLICATIONS

United States Patent and Trademark Office, "Final Office Action," issued in connection with U.S. Appl. No. 15/069,723, dated Sep. 13, 2017, 11 pages.

United States Patent and Trademark Office, "Non-final Office Action," issued in connection with U.S. Appl. No. 15/069,723, dated Dec. 11, 2017, 11 pages.

United States Patent and Trademark Office, "Final Office Action," issued in connection with U.S. Appl. No. 15/069,723, dated Jul. 6, 2018, 10 pages.

United States Patent and Trademark Office, "Non-final Office Action," issued in connection with U.S. Appl. No. 15/069,723, dated Oct. 12, 2018, 11 pages.

United States Patent and Trademark Office, "Notice of Allowance and Fee(s) Due," issued in connection with U.S. Appl. No. 15/069,723, dated May 1, 2019, 10 pages.

United States Patent and Trademark Office, "Non-final Office Action," issued in connection with U.S. Appl. No. 16/556,712, dated May 8, 2020, 15 pages.

United States Patent and Trademark Office, "Final Office Action," issued in connection with U.S. Appl. No. 16/556,712, dated Aug. 4, 2020, 12 pages.

United States Patent and Trademark Office, "Notice of Allowance and Fee(s) Due," issued in connection with U.S. Appl. No. 16/556,712, dated May 13, 2021, 8 pages.

Wylie, Jason; "3D Windows video demo", Nov. 21, 2014, YouTube.com, https://www.youtube.com/watch?v=znyhgh7U1pE (Year 2014); pp. 1-5.

METHOD AND SYSTEM FOR VIEWING SPORTS CONTENT WITHIN A VIRTUAL REALITY ENVIRONMENT

CROSS-REFERENCE TO RELATED APPLICATIONS

This application is a continuation of U.S. patent application Ser. No. 16/556,712 filed on Aug. 30, 2019, which is a continuation of U.S. patent application Ser. No. 15/069,723 (now U.S. Pat. No. 10,412,438), filed on Mar. 14, 2016. The contents of each of the foregoing is/are hereby incorporated by reference into this application as if set forth herein in full.

TECHNICAL FIELD

The present disclosure relates generally to viewing sporting events within a virtual reality environment.

BACKGROUND

The statements in this section merely provide background information related to the present disclosure and may not constitute prior art.

Satellite television has become increasingly popular due to the wide variety of content and the quality of content available. A satellite television system typically includes a set top box that receives and decodes satellite signals for viewing content on a television.

Satellite television systems typically broadcast content to a number of users simultaneously in a system. Satellite television systems also offer subscription or pay-per-view access to broadcast content. Access is provided using signals broadcast via a satellite. Once access is provided, a user can access the broadcast content.

Many content providers are offering systems that provide a centralized server with a large amount of video storage. Multiple client devices can connect to the server to display video content received from the server.

Virtual reality (VR) devices are gaining in popularity. This is particularly true for gaming systems. VR devices include a user interface and a head mounted display (HMD) that displays a VR environment. A view of the VR environment, displayed on the HMD (sometimes referred to as VR gear), typically changes with movement of a user of the HMD.

SUMMARY

The present disclosure provides methods and systems for displaying content and related information on a display of a virtual reality device.

In one aspect of the disclosure, a virtual reality system is provided and includes a head mounted display, an options module, a sensor or input device, a selection module, and a display module. The head mounted display is configured to display a virtual reality environment including sports content of a live game, a prerecorded game, or a sports channel. The options module is configured to generate an options signal to show viewing options in the virtual reality environment. The viewing options define viewing aspects for viewing the sports content within the virtual reality environment. The sensor or input device is connected to the head mounted display and configured to generate signals based on detection of at least one of movement of the head mounted display, movement of an eyeball of a user, voice communication of the user, or user contact with the input device. The selection module is configured to, based on the signals: select the sports content and one or more of the viewing options; and generate a selection signal indicating the sports content and the one or more of the viewing options. The display module is configured to display the sports content in the virtual reality environment based on the selection signal.

In a further aspect of the disclosure, a method of operating a virtual reality system is provided. The method includes: displaying on a head mounted display a virtual reality environment including sports content of a live game, a prerecorded game, or a sports channel; generating an options signal to show viewing options in the virtual reality environment; and generating, via at least one sensor or input device connected to the head mounted display, signals based on detection of at least one of movement of the head mounted display, movement of an eyeball of a user, voice communication of the user, or user contact with the input device. The viewing options define viewing aspects for viewing the sports content within the virtual reality environment. The method further includes: based on the generated signals, selecting the sports content and one or more of the viewing options; generating a selection signal indicating the sports content and the one or more of the viewing options; and displaying the sports content in the virtual reality environment based on the selection signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The teachings of the present disclosure can be implemented in a system for communicating content to an end user or user device (e.g., a mobile phone, a tablet, a computer, and/or a virtual reality device). Both the data source and the user device may include one or more modules having a memory or other data storage for incoming and outgoing data. For definitions and structure of the modules see below provided description and accompanying drawings.

A content and/or service provider is also described. A content and/or service provider is a provider of data to an end user. The service provider, for example, may provide data corresponding to the content such as metadata as well as actual content in a data stream or signal. The content and/or service provider may include one or more modules, processors, controllers, communication components, network interfaces and other associated circuitry to allow communication with various other devices in a system.

Further, while the following disclosure is made with respect to the delivery of video (e.g., television (TV), movies, music videos, etc.), it should be understood that the systems and methods disclosed herein may also be used for delivery of any media content type, for example, audio, music, data files, web pages, advertising, etc. Additionally, throughout this disclosure reference is made to data, content, information, programs, sports content, advertising, assets, video data, etc., however, these terms may be used interchangeably with respect to transferring data via the example systems disclosed herein. While the following disclosure is made with respect to example DIRECTV® broadcast services and systems, it should be understood that many other delivery systems are readily applicable to the disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point Distribution System (MMDS), Local Multi-point Distribution System (LMDS), etc.), Internet-based distribution systems, cellular distribution systems, power-line broadcast systems, any point-to-point and/or multicast Internet Protocol (IP) delivery network, and fiber optic networks. Further, different tasks performed by a service provider and integrated receiver/decoders (IRDs) as described below can be reallocated as desired without departing from the intended scope of this disclosure.

Figure 1:
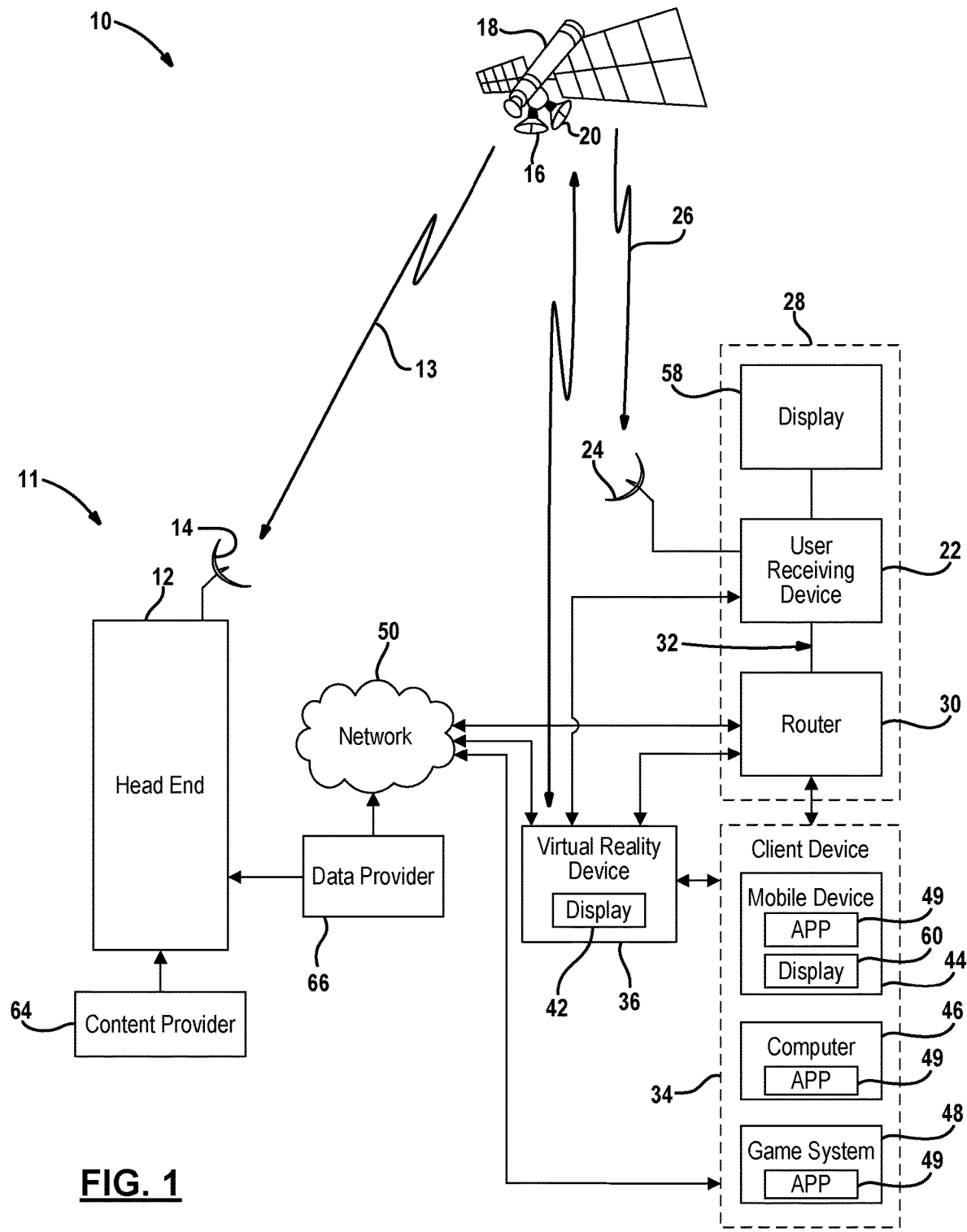
FIG. 1 is a high level block diagram of an example of a satellite distribution system in accordance with the present disclosure.

Referring now to FIG. 1, a satellite television broadcasting system 10 including a virtual reality system 11 is illustrated. The satellite television broadcast system 10 includes a head end 12 that generates wireless signals 13 through an antenna 14 which are received by an antenna 16 of a satellite 18. The wireless signals 13, for example, may be digital. The wireless signals 13 may be referred to as an uplink signal. A transmitting antenna 20 generates downlink signals 26 that are directed to a user receiving device 22. The user receiving device 22 may be located within a building 28 such as a home, multi-unit dwelling or business. The user receiving device 22 is in communication with an antenna 24. The antenna 24 receives downlink signals 26 from the transmitting antenna 20 of the satellite 18. Thus, the user receiving device 22 may be referred to as a satellite television receiving device. However, the system has applicability in non-satellite applications such as a wired or wireless terrestrial system. Therefore, the user receiving device 22 may be referred to as a television receiving device or set top box. More than one user receiving device 22 may be included within a system and/or within a building 28. The user receiving devices 22 may be interconnected.

The downlink signals 26 that are communicated to the antenna 24 may be live linear television signals. Live television signals may be referred to as linear content because the live television signals are broadcasted at a predetermined time on a predetermined channel. A grid guide commonly includes linear content arranged by channel and by time. The linear content is different than on-demand content that is communicated from the head end or other content distribution network to a user receiving device 22 when requested by the user. The client device 34 may also be in direct and/or bi-directional communication with a virtual reality device 36. The client device 34 may communicate via wires and/or wirelessly with the virtual reality device 36. A display (e.g., display 60) of the client device 34 may be used as a display of the virtual reality device 36. For example, the virtual reality device 36 may be plugged into or attach to the virtual reality device 36 and a screen of the client device 34 may be magnified by lenses within the virtual reality device 36. When used in this manner, the client device 34 may be considered as part of the virtual reality device 36. The operation of the client device 34 relative to the virtual reality device 36 is described in detail below. Video content (e.g., streaming video and/or live video content) may be transmitted from the satellite 18 (or a base station), the user receiving device 22, the client device 34, the network 50 to the virtual reality device 36. The video content may originate at the content provider 64 or the head end 12 and be transmitted to one or more of the devices 18, 22, 34, 36.

The client device 34 may include different types of devices. One or more client devices may be used in a system. In this example, the client device 34 includes and/or is implemented as one or more of a mobile device 44, a computer 46, and a game system 48. Each of the devices may include one or more applications (Apps, a single APP is shown for each device) and corresponding software code that is used for interfacing with the virtual reality device 36. Although shown in the client device 34, the application 49 or a portion thereof may be stored and executed on the virtual reality device 36. The applications may include video game applications, movie applications, sports applications (e.g., a national football league App, a national hockey league App, a national basketball league App, a professional sports App, etc.), or other types of computer programs that are used to display content on one or more of the displays disclosed herein, such as the displays 42, 60. As mentioned above, one or more client devices 34 may be included in the system 10 and communicate with the virtual reality device 36. The mobile device 44 may be a mobile phone, tablet computer, laptop computer, or other type of mobile computing device. The computer 46 may be a desk top computer. The game system 48 may operate various types of video games that use the virtual reality device 36 as an input and as a display.

The user receiving device 22 may be in communication with a router 30 that forms a local area network 32 with a client device 34 and/or a virtual reality device 36. The router 30 may be a wireless and/or wired router. For example, the user receiving device 22 may be wired to the router 30 and wirelessly coupled to the client device 34 and to the virtual reality device 36. The router 30 may communicate internet protocol (IP) format signals to the user receiving device 22. The IP signals may be used for controlling various functions of the user receiving device 22. IP signals may also originate from the user receiving device 22 for communication to other devices such as the client device 34 or the virtual reality device 36 through the router 30. The client device 34 and the virtual reality device 36 may also communicate signals to the user receiving device 22 through the router 30.

The virtual reality device 36 may be wearable on a user meaning it is meant to be fixed to the user during operation. An example of a virtual reality device 36 includes an Oculus VR® device. The complexity of the virtual reality device 36 may vary from a simple display device with motion sensor to a device having various inputs and user interfaces. The virtual reality device 36 may be in direct communication with the user receiving device 22 and/or the client device 34 through a Bluetooth® connection. The virtual reality device 36 may also be in communication with the user receiving device 22 and the client device 34 through an IP connection through the router 30 and a local area network. The virtual reality device 36 may also be in communication with devices outside the local area network 32 through the router 30. That is, the virtual reality device 36 may communicate with other devices such as the head end 12 through the network 50. The client device 34 may provide a bridge or a communication path for the virtual reality device 36 to the router 30 and ultimately to the user receiving device 22 or the network 50. The virtual reality device 36 may generate signals such as selection signals that are communicated through the client device 34 but are destined to be used by the user receiving device 22, the head end 12 or other user devices in communication with the network 50.

The client device 34 may also be in communication with the router 30, the head end 12 and various other devices through the network 50 or other devices in other parts of the network 50.

The user receiving device 22 includes a screen display 58 associated therewith. The display 58 may be a television or other type of monitor. The display 58 may display both video signals and audio signals.

The client device 34 may also have a display 60 associated therewith. The display 60 may also display video and audio signals. The display 60 may be integrated into the client device 34. The display 60 may also be a touch screen that acts as at least one user interface. Other types of user interfaces on the client device 34 may include buttons and switches.

Figure 9:
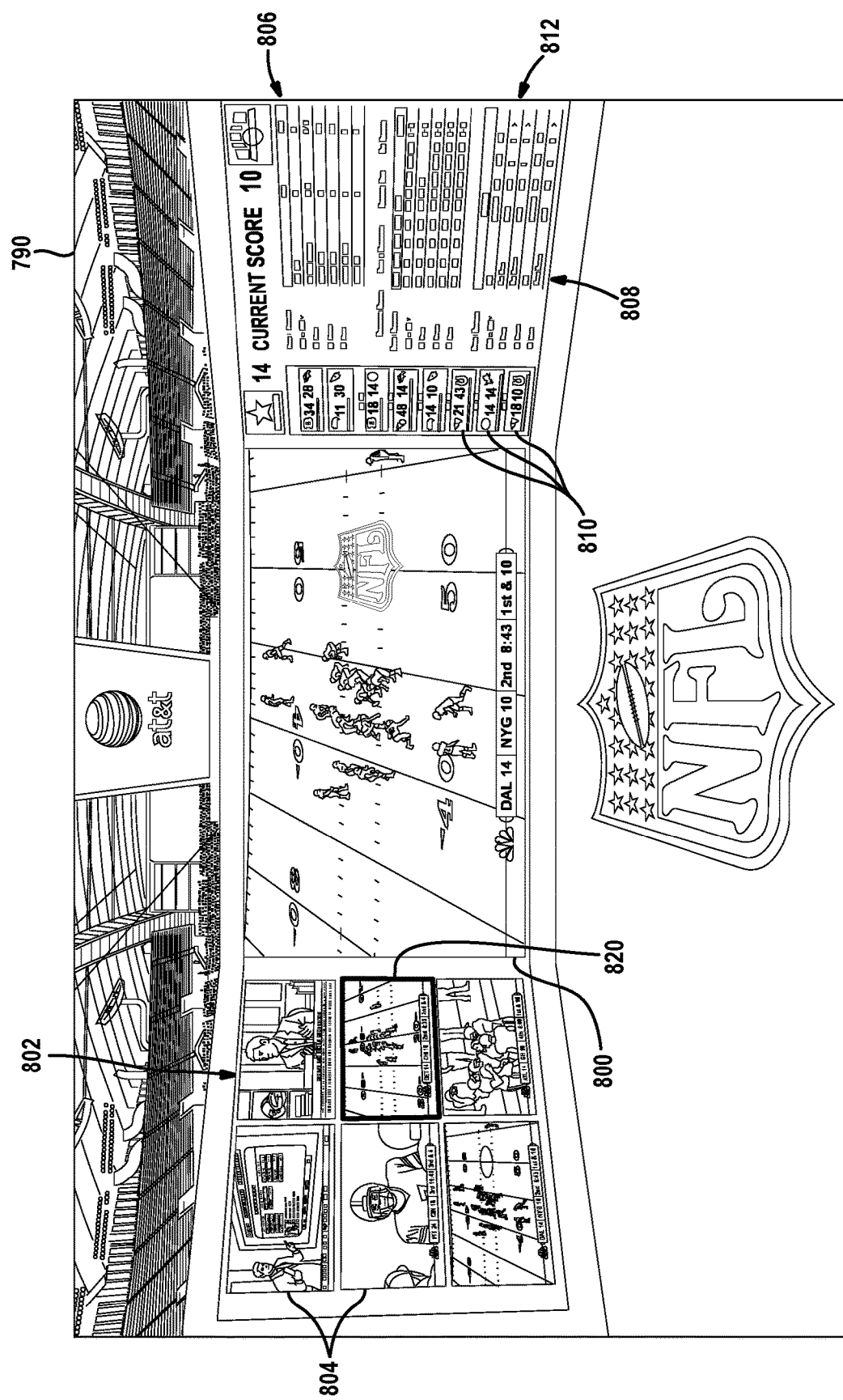
FIG. 9 is an example of a field-of-view displayed on a screen of the virtual reality device of FIG. 6 in accordance with the present disclosure.
Figure 10:
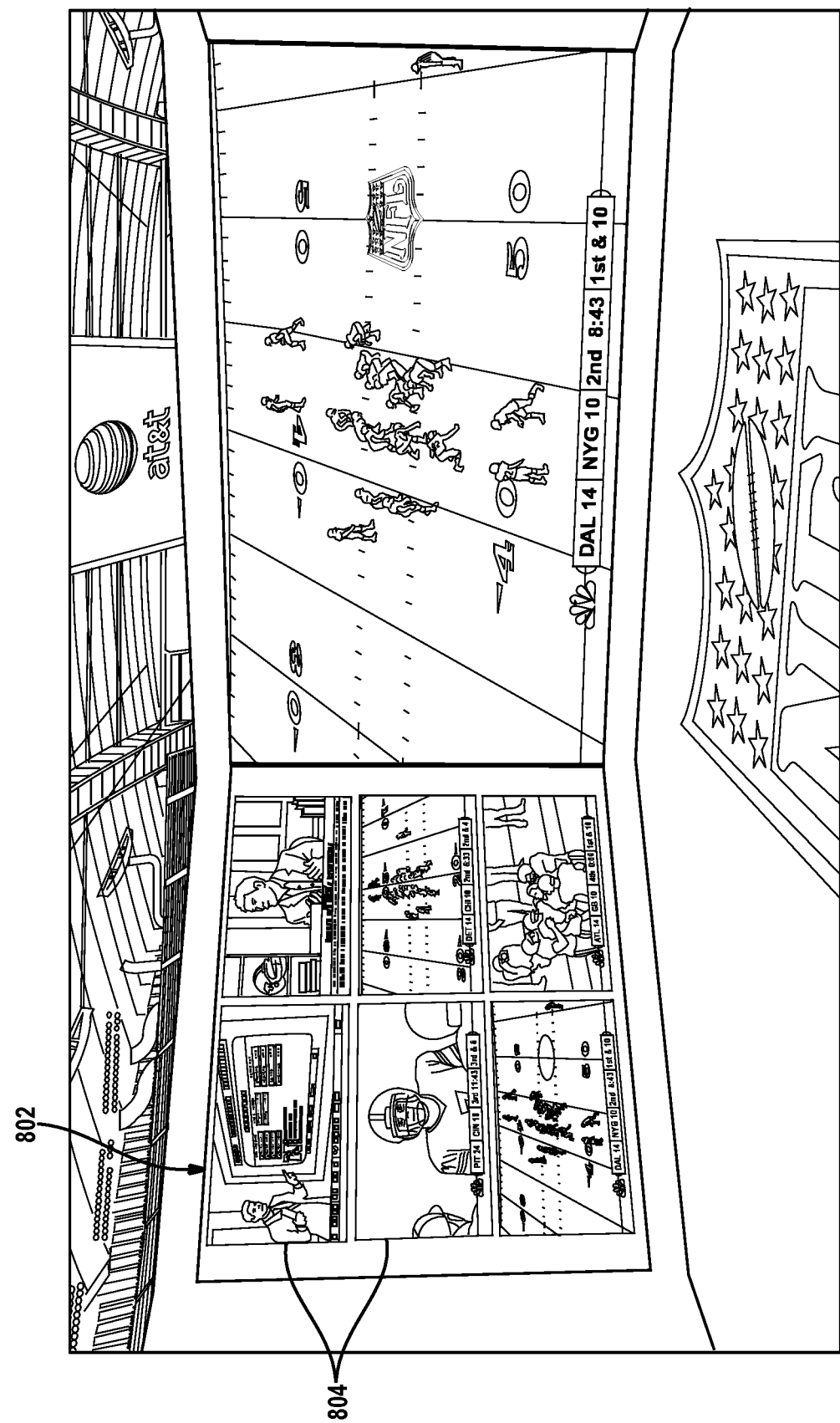
FIG. 10 is another example of a field-of-view displayed on a screen of the virtual reality device of FIG. 6 in accordance with the present disclosure.

The display 42 of the virtual reality device 36 may also display video and audio signals. The display 42 may be integrated into the virtual reality device 36. The display 42 may be a stereoscopic display that displays different images for each eye of the user. Images of the display 42, as viewed by a user, may be combined in the brain of the user to form a continuous image. A projected display or user interface may also be projected on the display 42. The virtual reality device 36 may also include physical function selectors, switches, or buttons as other types of user interfaces (e.g., touch pad) for selecting displayed tiles (sometimes referred to as chicklets), stadium sections, points of reference, stadium seats, stadium cameras, etc. Tiles may refer to portions of displayed video that include selectable content. Examples of tiles are shown in FIG. 9. Although the term "stadium" is primarily used herein to refer to any facility in which a sports game is played, the term stadium may be replaced with and/or refer to an arena, a dome or facility having an air-supported structure, a gym, or some other facility or structure in which a sports game can be played.

The user receiving device 22 may be in communication with the head end 12 through an external network, such as network 50. The network 50 may include one type of network or multiple types of networks. The network 50 may, for example, include a public switched telephone network, the Internet, a mobile telephone network or other type of network. The network 50 may be in communication with the user receiving device 22 through the router 30. The network 50 may also be in communication with the client device 34 through the router 30. The network 50 may be in direct communication with the client device 34 or virtual reality device 36 such as in a cellular system implementation.

The system 10 may also include a content provider 64 that provides content to the head end 12. Although only one content provider 64 is illustrated, more than one content provider may be included in the system 10. The head end 12 is used for distributing the content through the satellite 18 or the network 50 to the user receiving device 22, client device 34, or the virtual reality device 36.

A data provider 66 may also provide data to the head end 12. The data provider 66 may provide various types of data such as schedule data or metadata. The metadata may ultimately be provided to a user device through the program guide system. The metadata may include various descriptions, ratings, titles, user ratings, television or parental guidance ratings, descriptions, related descriptions and various other types of data. The data provider 66 may provide the data directly to the head end 12 and may also provide data to various devices such as the client device 34, virtual reality device 36, mobile device 44 and the user receiving device 22 through the network 50 or the user receiving device 22 via the router 30. This may be performed in a direct manner through the network 50 or indirectly through the user receiving device 22.

Figure 2:
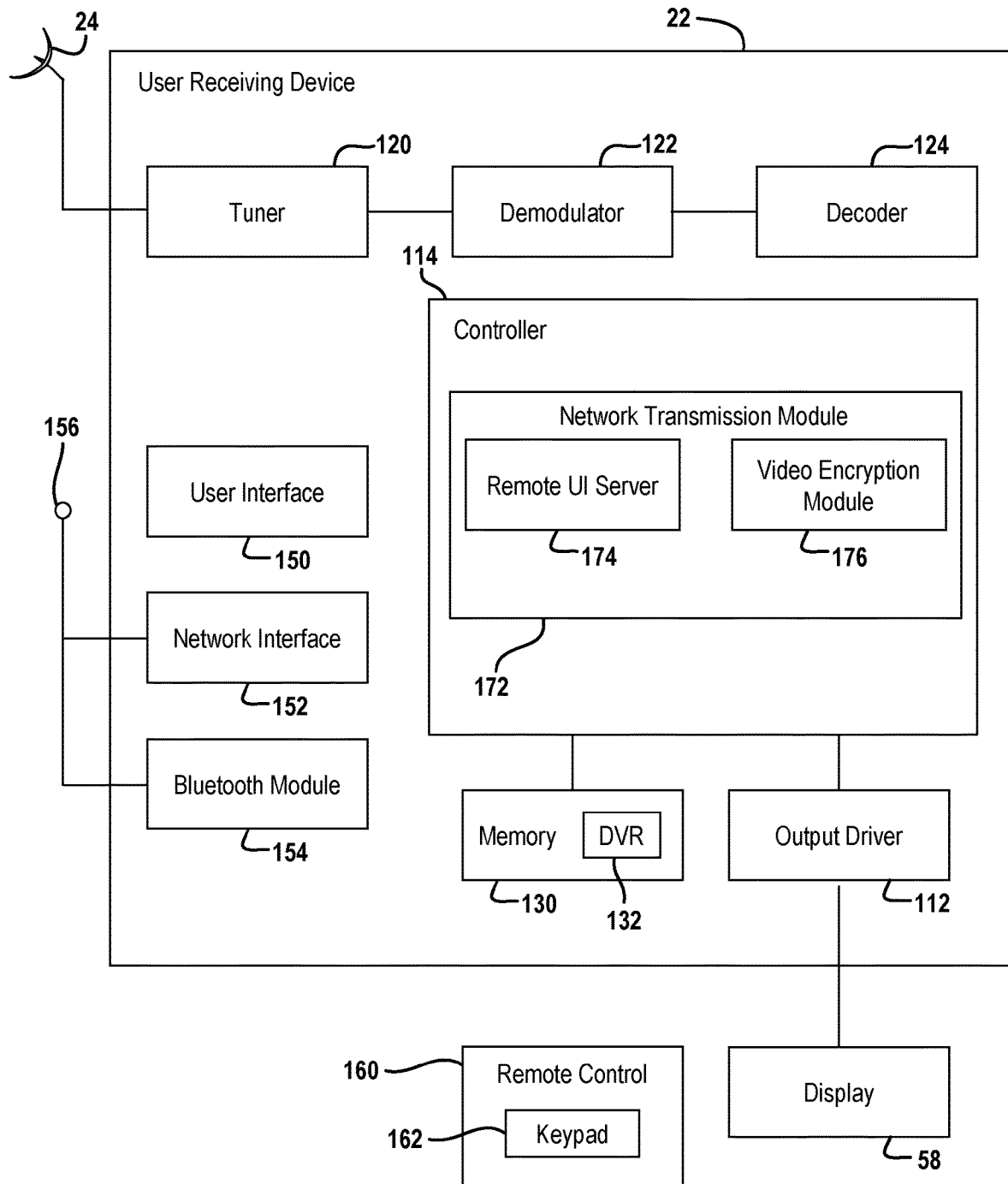
FIG. 2 is a block diagram of an example of a user receiving device in accordance with the present disclosure.

Referring now to FIG. 2, a user receiving device 22, such as a set top box is illustrated in further detail. Although, a particular configuration of the user receiving device 22 is illustrated, other configurations with an internal controller receiving content may be implemented. Each of the components illustrated may be capable of communicating with each other.

The antenna 24 may be one of a number of different types of antennas that includes one or more low noise blocks. The antenna 24 may be a single antenna 24 used for satellite television reception. The user receiving device 22 is in communication with the display 58. The display 58 may have an output driver 112 within the user receiving device 22.

A controller (or control module) 114 may be a processor such as a microprocessor that cooperates with control software. The controller 114 may be used to coordinate and control various devices of the user receiving device 22. These devices may include a tuner 120, a demodulator 122, a decoder 124 (e.g., a forward error correction decoder), a buffer and/or other devices.

The tuner 120 receives a signal and/or data via an individual satellite channel and/or channel bonding. The tuner 120 may receive television programming content, program guide data or other types of data. The demodulator 122 demodulates the signal and/or data to form a demodulated signal and/or data. The decoder 124 decodes the demodulated signal to form decoded data and/or a decoded signal. The controller 114 may be a chip-based multi-functional controller. Although only one tuner 120, one demodulator 122 and one decoder 124 are illustrated, multiple tuners, demodulators and decoders may be provided within a single user receiving device 22.

The controller 114 is in communication with a memory 130. The memory 130 is illustrated as a single box with multiple boxes therein. The memory 130 may include different types of memory, such as a hard drive, a flash drive and various other types of memory. The different boxes represented in the memory 130 may be other types of memory or sections of different types of memory. The memory 130 may include nonvolatile memory and/or volatile memory.

The memory 130 may include storage for content data and operational data collected during operation of the user receiving device 22. The memory 130 may also include advanced program guide (APG) data. The program guide data may include various amounts of data including two or more weeks of program guide data for a program guide. The program guide data may be communicated in various manners including through the satellite 18 of FIG. 1. The program guide data may include a content or program identifiers, and various data objects corresponding thereto. A program guide may include program characteristics for respective program content. The program characteristic may include ratings, categories, sports information, content identifier and producer data. The data may also include various user profiles such as other settings like parental controls.

The memory 130 may also store a user receiving device identifier that uniquely identifies the user receiving device 22. The user receiving device identifier may be used in communications through the network to address commands thereto.

The memory 130 may also include a digital video recorder. The digital video recorder 132 may be a hard drive, flash drive, or other memory device. A record of the content stored in the digital video recorder 132 is a playlist. The playlist may be stored in the DVR 132 or a separate memory as illustrated.

The user receiving device 22 may also include a user interface 150. The user interface 150 may be of various types or combinations of various types of user interfaces and include a keyboard, push buttons, a touch screen and/or a remote control. The user interface 150 may be used to select a channel, select information, change the volume, change appearance of a display, and/or perform other functions. The user interface 150 may be used for generating a selection signal for selecting content and/or data shown on the display 58.

A network interface 152 may be included within the user receiving device 22 to communicate various data through the network 50 illustrated above. The network interface 152 may be configured for a WiFi, WiMax, WiMax mobile, wireless, cellular, and/or other type of communication systems. The network interface 152 may use various protocols for communication therethrough including, but not limited to, hypertext transfer protocol (HTTP).

A Bluetooth® module 154 may send and receive Bluetooth® formatted signals to or from the client device 34 and/or virtual reality device 36. Both the Bluetooth® module 154 and the network interface 152 may be connected to one or more wireless antennas 156. The antennas 156 generate RF signals that may correspond to user receiving device identifiers.

A remote control device 160 may be used as a user interface for communicating control signals to the user receiving device 22. The remote control device may include a keypad 162 for generating key signals that are communicated to the user receiving device 22.

The controller 114 may also include a network transmission module 172. The network transmission module 172 may be used to (i) generate and communicate signals that are renderable such as the program guide, playlist and other menus, and also (ii) communicate the output of the decoder 124. The signals, which are formed by the network transmission module 172, may include both audio signals and video signals. One suitable transmission format for live signals to a client is a digital transmission content protection over Internet protocol (DTCP-IP). The user receiving device 22 may communicate securely with the client using the DTCP-IP signals. A video encryption module 176 may encrypt video signal and audio signals communicated from the user receiving device 22. A remote interface server module 174 may be used for communicating the program guide, banners, playlists and other renderable signals without the need for encryption. By providing renderable signals, the client device 34 may include or be implemented as a computer, a mobile device, and/or a gaming device.

Figure 3:
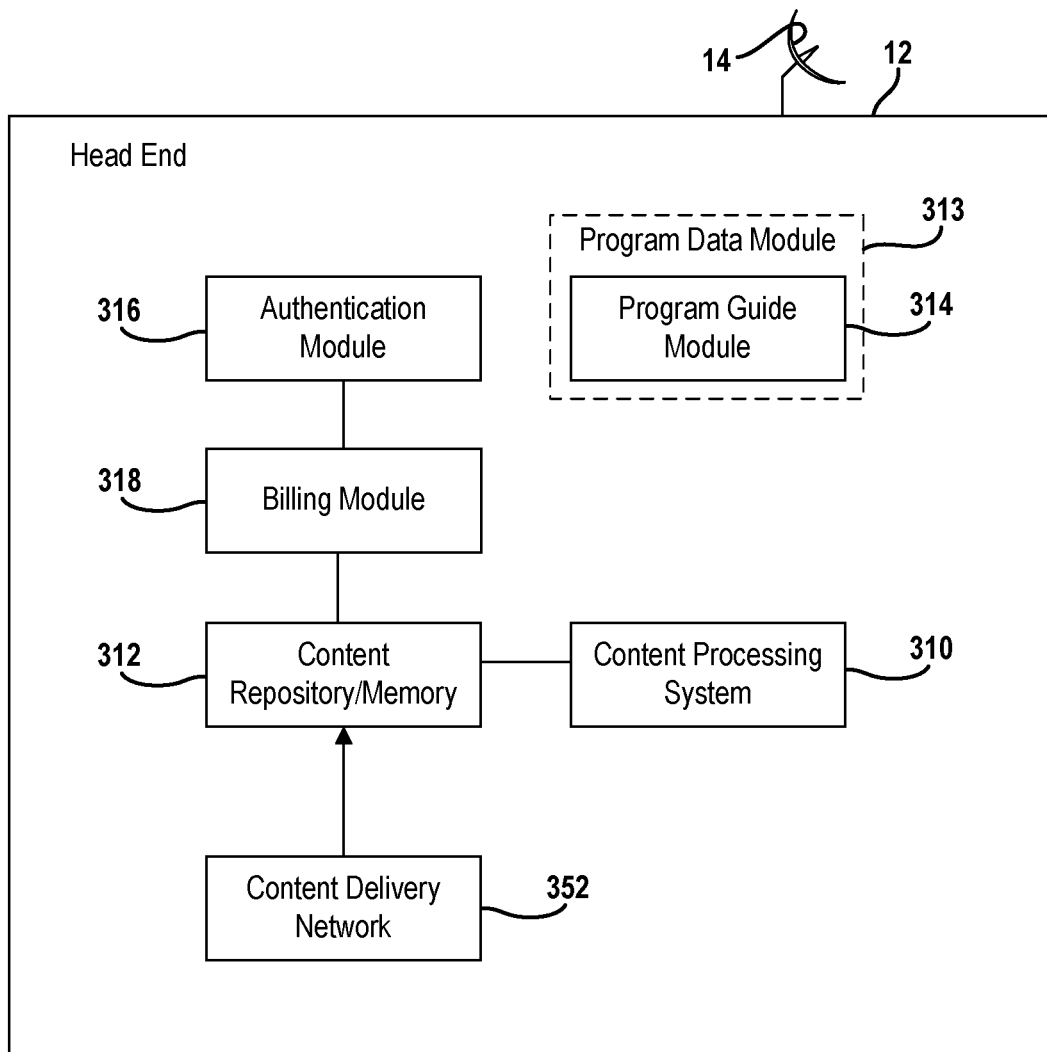
FIG. 3 is a block diagram of an example of a head end in accordance with the present disclosure.

Referring now to FIG. 3, the head end 12 is illustrated in further detail. The head end 12 may include various modules for intercommunicating with the client device 34 and the user receiving device 22, as illustrated in FIG. 1. Only a limited number of interconnections of the modules are illustrated in the head end 12 for drawing simplicity. Other interconnections may be present in a constructed example. The head end 12 receives content from the content provider 64 illustrated in FIG. 1. A content processing system 310 processes the content for communication through the satellite 18. The content processing system 310 may communicate live and recorded content as linear content (at a predetermined time and on a corresponding channel). The content processing system 310 may be connected to a content repository/memory 312 for storing content therein. The content repository/memory 312 may store and process on-demand or pay-per-view content for distribution at various times. The virtual reality device 36 may also display on-demand content. The pay-per-view content may be broadcasted in a linear fashion (at a predetermined time according to a predetermined schedule). Linear content is presently broadcasting and may also be scheduled in the future. The content repository/memory 312 may also store on-demand content therein. On-demand content is content that is broadcasted at the request of a user receiving device and may occur at any time (not on a predetermined schedule). On-demand content is referred to as non-linear content.

The head end 12 also includes a program data module 313 that may include various types of data related to programming past, present and future. A program guide module 314 may also be included in the program data module 313. The program guide module 314 may include the programming data for present and future program data. The program guide module 314 communicates program guide data to the user receiving device 22 illustrated in FIG. 1. The program guide module 314 may create various objects that are communicated with various types of data therein. The program guide module 314 may, for example, include schedule data, various types of descriptions for the content, and content identifiers that uniquely identify content items. The program guide module 314 may communicate up to two weeks of advanced guide data for linear content to the user receiving devices. The guide data includes, for example, tuning data such as time of broadcast data, end time data, channel data, and transponder data. Guide data may also include content available on-demand and pay-per-view content.

An authentication module 316 may be used to authenticate different user receiving devices, client devices and virtual reality devices that communicate with the head end 12. Each user receiving device, client device and virtual reality device may have a unique identifier. The user identifiers may be assigned at the head end or associated with a user account at the head end 12. The authentication module 316 may be in communication with a billing module 318. The billing module 318 may provide subscription data and authorization data suitable for the user receiving devices, the client devices and virtual reality devices that interact with the head end 12. The authentication module 316 ultimately permits the user receiving devices and client devices to communicate with the head end 12. Authentication may be performed by providing a user identifier, a password, a user device identifier or combinations thereof.

A content delivery network 352 may be in communication with a content repository 312. The content delivery network 352 is illustrated outside of the head end 12. However, the content delivery network 352 may also be included within the head end 12. The content delivery network 352 may be managed or operated by operators other than the operators of the head end 12. The content delivery network 352 may be responsible for communicating content to the various devices outside of the head end 12. Although only one content delivery network 352 is illustrated, multiple content delivery networks may be used.

Figure 4:
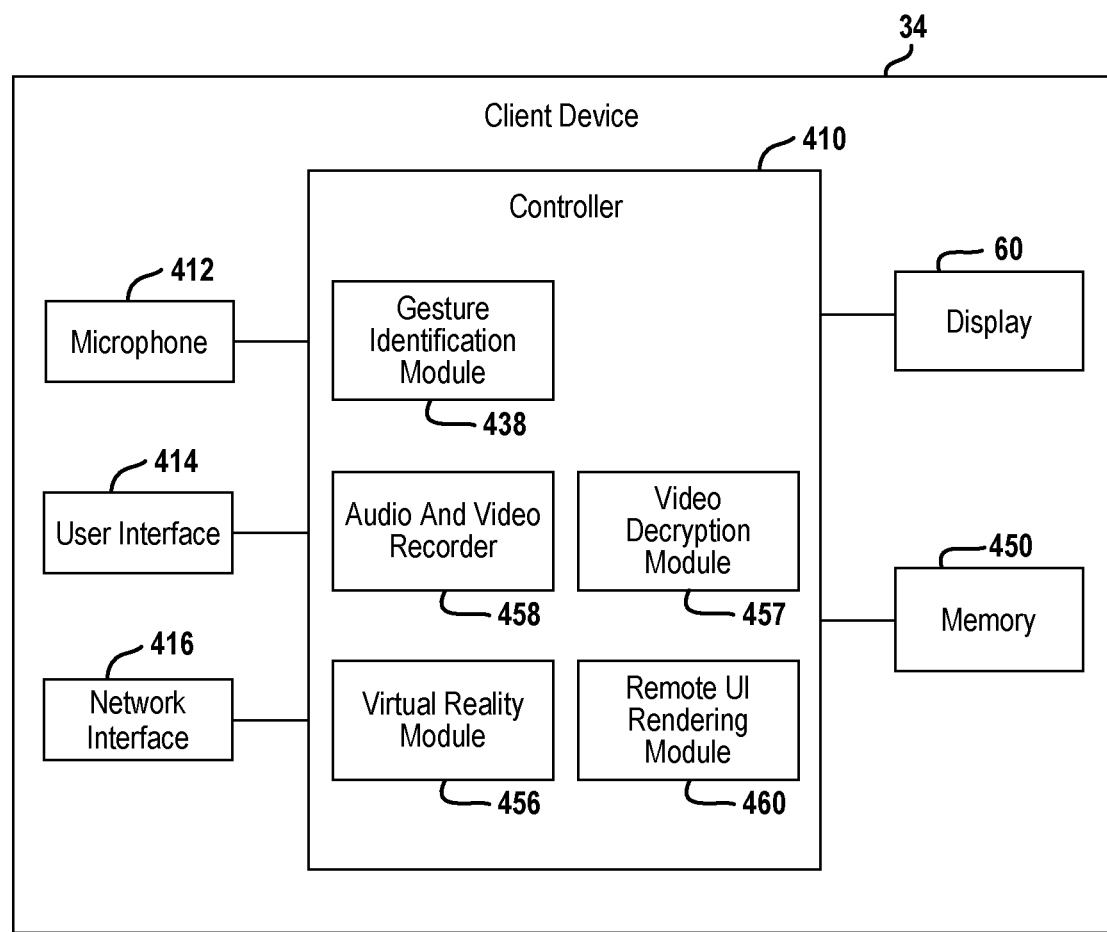
FIG. 4 is a block diagram of an example of a client device in accordance with the present disclosure.

Referring now to FIG. 4, the client device 34 is illustrated in further detail. The client device 34 includes a controller 410. The controller 410 is in communication with a microphone 412, which receives audible signals and converts the audible signals into electrical signals. The audible signals may include a request signal. The request signal may be to: perform a search; obtain guide data, network data, and/or playlist data; select a sports game and/or channel; select an option and/or a viewing parameter; execute an App; display a game; select a section, seat, camera, view; etc.

The controller 410 is also in communication with a user interface 414. The user interface 414 may include buttons, input switches and/or a touch screen.

A network interface 416 is also in communication with the controller 410. The network interface 416 may be used to interface with the network 50. As mentioned above, the network 50 may be a wireless network or the internet. The network interface 416 may communicate with a cellular system or with an Internet or both. A network identifier may be attached to or associated with each communication signal received from the client device 34, such that a determination may be made by another device as to whether the client device 34 and the user receiving device 22 are in the same local area network.

The controller 410 may also be in communication with the display 60 described above in FIG. 1. The controller 410 may generate graphical user interfaces and content descriptions.

The controller 410 may also include a gesture identification module 438 that identifies gestures performed on the display 60. For example, a user in providing a gesture may drag a finger up, down, and/or sideways on the display 60 and/or hold the finger in a location on the display 60 for a predetermined amount of time. A gesture performed on a certain screen may be (i) translated into a particular control command for making a selection, and/or (ii) translated into a signal communicated to the user receiving device 22.

The client device 34 and/or the virtual reality device 36 may include a virtual reality module 456. The virtual reality module(s) 456 may be included within the controller 410 of the client device 34 or in the controller 510 (shown in FIG. 5) of the virtual reality device 36. The virtual reality module 456 may obtain sensor data and scale live video for display by a virtual reality device (the virtual reality device 36 or a combination of the devices 34, 36) based on the sensor data. That is, a live television display area may be defined within graphics of a virtual reality program or application executed by the virtual reality device. The field-of-view and viewing angle of a virtual reality 3D environment may change based on the sensor data. Output of the virtual reality module may include audio and video signals. The video signals may include image data that is displayed on the display 42 or 60.

The controller 410 may also include a video decryption module 457 for decrypting the encrypted audio signals and video signals received from the user receiving device to form decrypted signals. The decryption module 457 may decrypt the DTCP-IP formatted signals. An audio and video decoder 458 processes the decrypted signals for display. A remote user interface renderer 460 renders the non-encrypted signals to form a displayed image of, for example, a program guide. The video and rendered graphics signals may be communicated to the virtual reality module 456 for scaling and display together with the virtual reality graphics.

Figure 5:
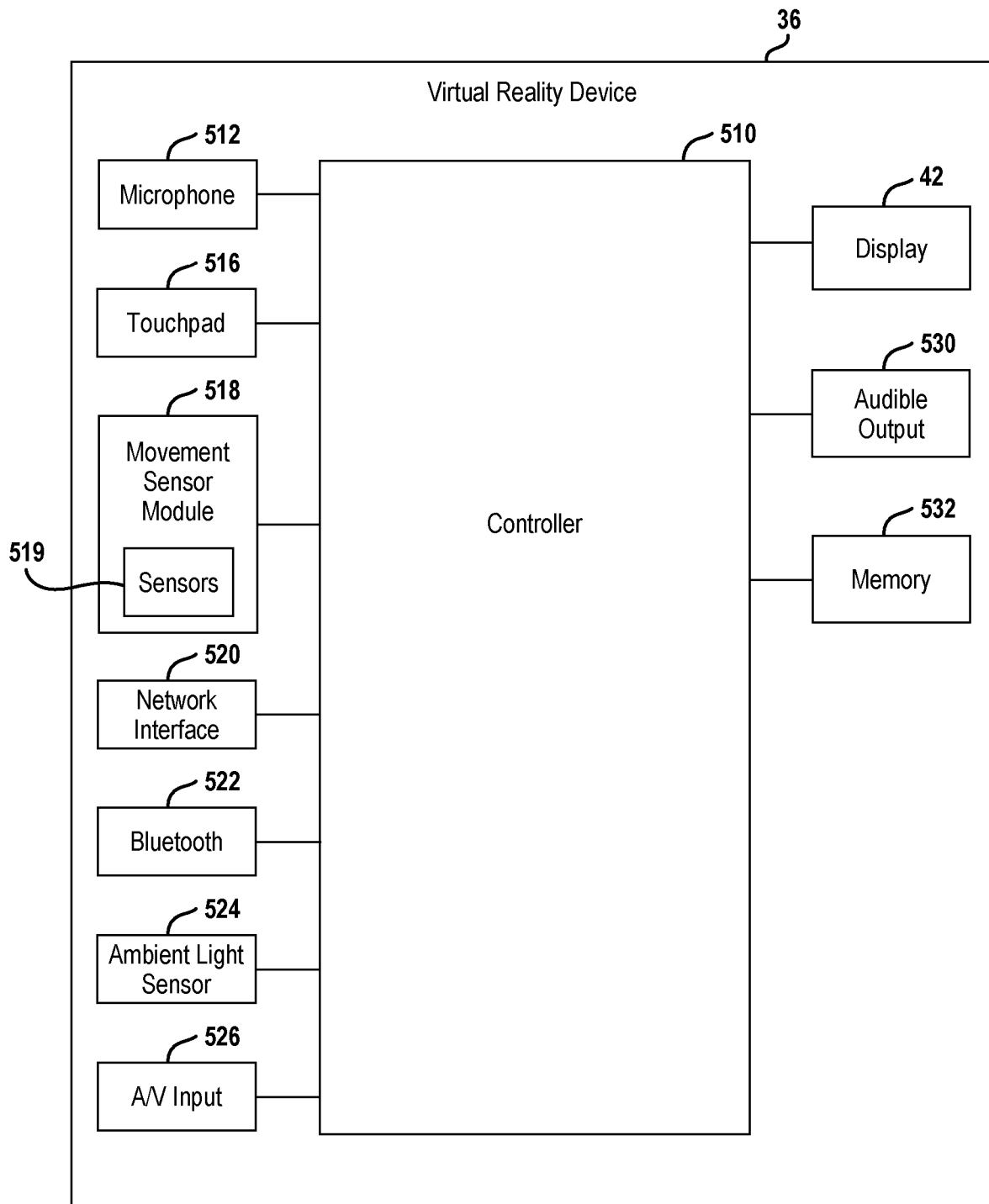
FIG. 5 is a block diagram of an example of a wearable device in accordance with the present disclosure.

Referring now to FIG. 5, a block diagrammatic view of virtual reality device 36 is set forth. The virtual reality device 36 may include a microphone 512 that receives audible signals and converts the audible signals into electrical signals. A touchpad 516 provides digital signals corresponding to the touch of a hand or finger. The touchpad 516 may sense the movement of a finger or other user input. The virtual reality device 36 may also include a movement sensor module 518 that provides signals corresponding to movement of the device. Physical movement of the device may also correspond to an input. The movement sensor module 518 may include sensors 519, such as accelerometers, moment sensors, optical/eye motion detection sensors, and/or other sensors that generate signals allowing a device to determine relative movement and orientation of the device and/or movement of eye balls of a user (referred to as gaze tracking). The movement sensor module 518 may also include a magnetometer. Sensor data provided by the various sensors 519 may be used to select tiles, stadium sections, stadium seats, stadium cameras, viewing angles, entries of shown tables, etc. The touchpad 516 and the sensors 519 provide input and/or feedback from a user for the selection of offered/shown items and provide commands for changing a shown field of view (FOV).

The virtual reality device 36 may also include a network interface 520. The network interface 520 provides input and output signals to a wireless network, such as the internet. The network interface 520 may also communicate with a cellular system.

A Bluetooth® module 522 may send and receive Bluetooth® formatted signals to and from the controller 510 and communicate the signals externally to the virtual reality device 36. Bluetooth® may be one way to receive audio signals or video signals from the client device 34.

An ambient light sensor 524 generates a signal corresponding to the ambient light levels around the virtual reality device 36. The ambient light sensor 524 generates a digital signal that corresponds to the amount of ambient light around the virtual reality device 36 and adjusts the brightness level in response thereto.

An A/V input 526 may receive the audio signals and the video signals from the client device 34. In particular, the A/V input 526 may be a wired or wireless connection to the virtual reality application of the client device 34.

The controller 510 may also be in communication with the display 42 an audio output 530 and a memory 532. The audible output 530 may generate an audible signal through a speaker or other device. Beeps and buzzers to provide the user with feedback may be generated. The memory 532 may be used to store various types of information including a user identifier, a user profile, a user location and user preferences. Of course, other operating parameters may also be stored within the memory 532.

Figure 6:
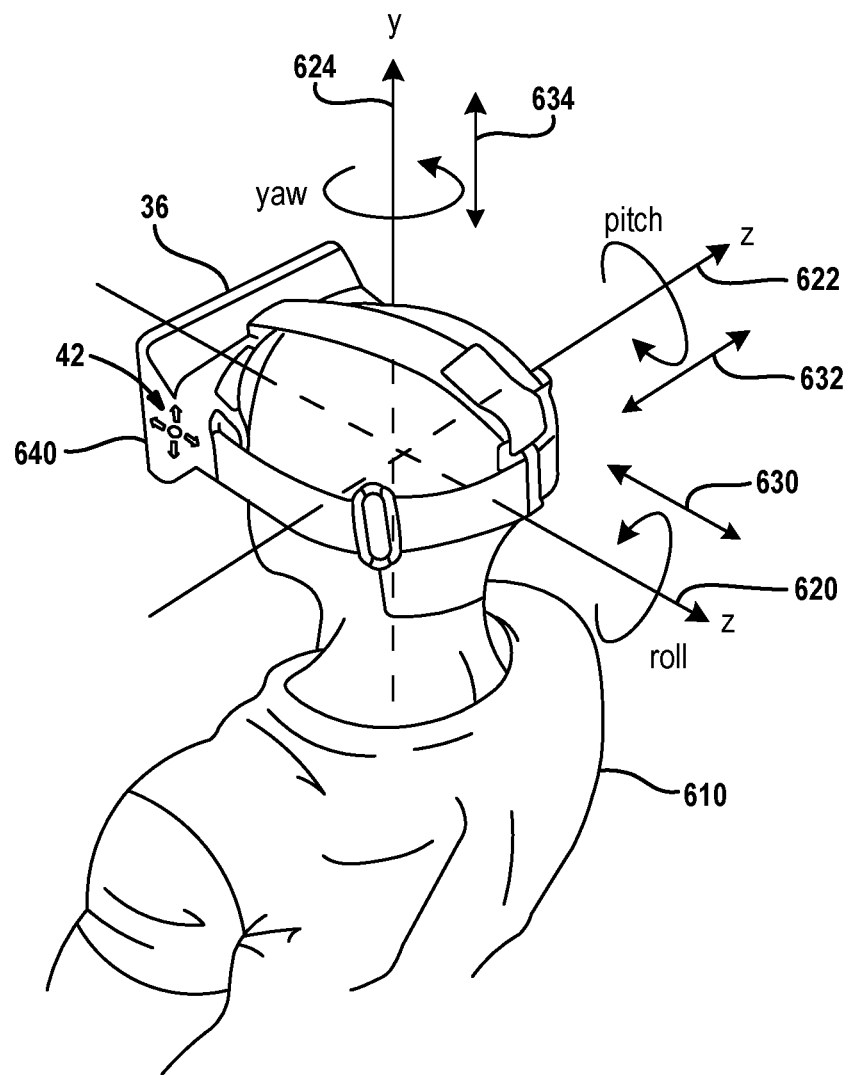
FIG. 6 is a perspective view of a virtual reality device on a user and illustrating linear and angular motion that may be monitored by the virtual reality device.

Referring now to FIG. 6, the movement sensors 518 of FIG. 5 may be used to measure various perimeters of movement. A user 610 has the virtual reality device 36 coupled thereto. The moments around a roll axis 620, a pitch axis 622 and a yaw axis 624 are illustrated. Accelerations in the roll direction 630, the pitch direction 632 and the yaw direction 634 are measured by sensors within the virtual reality device 36. The sensors may be incorporated into the movement sensor module 518, the output of which is communicated to the client device 34 for use within the virtual reality module 456. An example touchpad 638 is shown on a side of the virtual reality device 36.

The virtual reality device 36 includes a head mounted display (HMD) 42. The HMD 42 may be the display 60 of the client device 34 of FIG. 1 or may be a display that is fixed within the virtual reality device 36.

Figure 7:
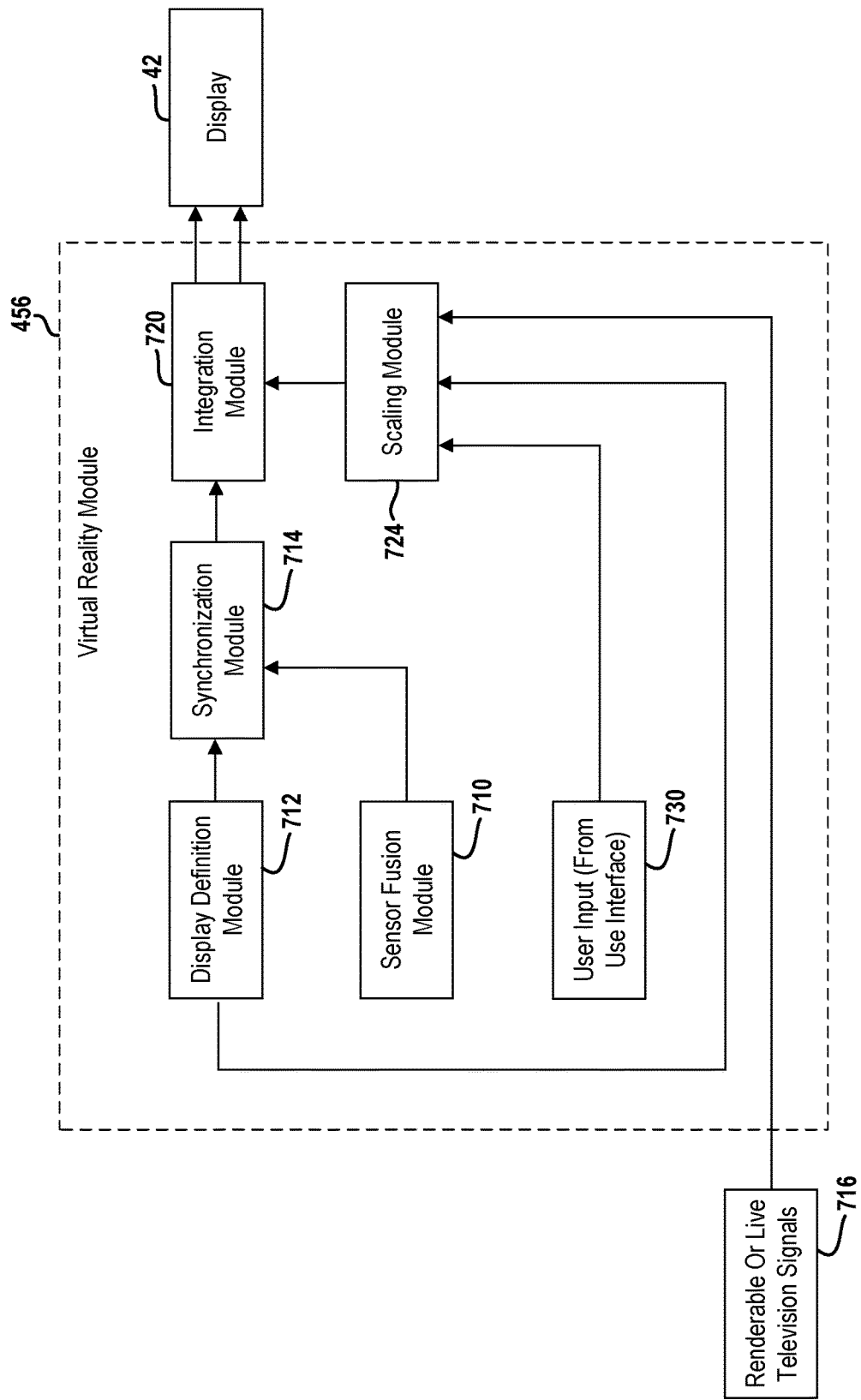
FIG. 7 is a block diagram of an example of a virtual reality module of the virtual reality device of FIG. 6 in accordance with the present disclosure.

Referring now to FIG. 7, an example of the virtual reality module 456 is illustrated in further detail. The virtual reality module 456 may include a sensor fusion module 710 that receives the sensor signals from the sensors 519, the touchpad 516, the microphones 412, 512 of FIGS. 4-5. The sensor fusion module 710 determines the ultimate movement of the virtual reality device 36 and/or eyeball movement to change content being displayed and/or to select a portion of content being shown.

The virtual reality module 456 may also include a live definition module 712. The display definition module 712 may define a display area for displaying live signals and/or renderable signals with the displayed graphics of an application or program.

The virtual reality system 11 disclosed herein change images and/or field of view angles displayed based upon the position of a head of a user, movement of the head (thus movement of the virtual reality device 36 of FIG. 1), audio command or request signals of the user, and/or eye movement of the user, as determined by the sensor fusion module 710. The movement of the head corresponds directly to the movement of the virtual reality device 36. The output of the display definition module 712 may be input to a synchronization module 714. The synchronization module 714 coordinates the position of the video display with the output of the sensor fusion module 710. The synchronization module output 714 is communicated to an integration module 720.

The integration module 720 may also receive an output from a scaling module 724. The renderable or live television signals 716 are communicated to the scaling module 724 to be properly scaled for the size and perspective of a display area of graphics generated by the virtual reality module 456. The renderable or live television signals 716 may be replaced with other video content signals. The integration module 720 outputs rendered signals corresponding to the application and the live television signals that have been scaled to the display 42. This may include sending audio content to one or more speakers of: the virtual reality device 36; and/or the client device 34 if the client device 34 is being used as part of the virtual reality device 36.

A user input 730 from a user interface such as a game controller or a touch screen may also be used to change the screen display. For example, the video may change from the display area graphics to a full screen upon command from the user. A button or voice command signal may be generated to perform this function.

Figure 8:
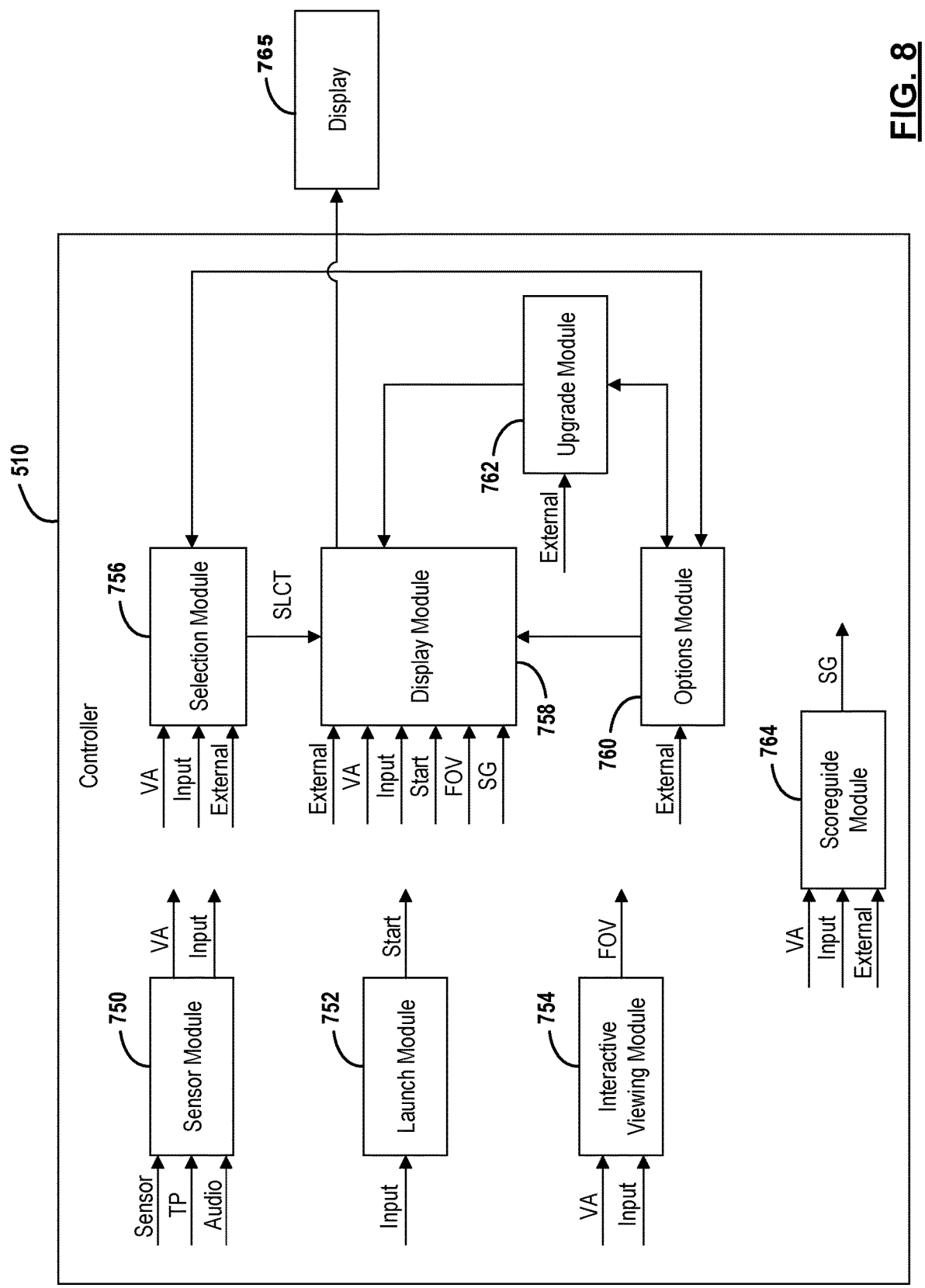
FIG. 8 is a block diagram of an example of a portion of a controller of the client device of FIG. 4 or the virtual reality device of FIG. 6 in accordance with the present disclosure.

FIG. 8 shows an example of a portion of the controller (or control module) 510. The controller 510 may further include a sensor module 750, a launch module 752, an interactive viewing module 754, a selection module 756, a display module 758, an options module 760, an upgrade module 762, and a scoreguide module 764. The sensor module 750 may include the sensor fusion module 710 of FIG. 7 and receive sensor signals SENS from the sensors 519 of FIG. 5, audio signals AUDIO from microphones 412, 512 of FIGS. 4-5, and/or a signal TP from an input device (e.g., a device having buttons and/or a touch pad) on a virtual reality device (e.g., one of the virtual reality devices disclosed herein). The sensor module 750 may generate a viewing angle signal VA and/or a sensor input signal INPUT. The viewing angle signal VA may indicate: linear and/or angular motion and/or position of a virtual reality device (the virtual reality device 36 of FIG. 1 or other virtual reality device); motion and/or position of user eye balls; a requested viewing angle; an amount of time the virtual reality device 36 and/or user eye balls are located in particular positions; angular position information; displacement from a previous position; and/or other position indicative information indicating position, angles and/or orientation of the virtual reality device and/or eye balls in 3D space. The input signal INPUT may be generated based on the signal TP and indicate, for example, buttons pressed by a user, length of time the buttons are pressed, and/or other input information.

The launch module 752 launches an App (i.e. starts execution of a selected App). For example, a user may launch a sports App, as further described below with respect to the method of FIG. 9. This may be based on and/or in response to one or more of the signals VA, INPUT and/or the information included in the signals VA, INPUT. The launch module 752 may generate a signal START indicating that the App is started and/or video content to be displayed on the display 765.

The interactive viewing module 754 may generate a field-of-view signal FOV indicating a FOV based on one or more of the signals VA, INPUT and/or the information included in the signals VA, INPUT. The FOV may include and/or be a portion of a virtual reality environment and is displayed on the display 765 (e.g., one of the displays 42, 60). The virtual reality environment may be viewed (i) at a location remotely located away from and external to a facility in which a sports game is being played, or (ii) at a location within the facility. The sports game is viewed in the virtual reality environment. This allows a user to view the sports game at different points of reference and to look around the inside of the facility from the different points of reference. As an example, the user may see these views while sitting at home. As another example, a user may be sitting in a first location in the facility and via the virtual reality device 36 see the inside of the facility from other locations.

As a user's head and/or eye balls move, the FOV changes. The FOV may be a view from one or more cameras within a stadium. Images from one or more cameras may be stitched together to provide up to a 360° virtual reality environment for viewing inside the stadium. The images may be received by the head end 12 of FIG. 1 and forwarded to the virtual reality device. The images may be stitched together via the head end 12, the controller 410 of the client device 34, the controller 510 of the virtual reality device 36 and provided to the interactive viewing module 754. The images may be forwarded to the virtual reality device 36 prior to receiving updated versions of the signals VA, INPUT to provide quick response time in viewing the FOV on the display 765.

As further described below, the user may select various viewing parameters for one or more points of reference within the stadium. One or more cameras may be located at each of the points of references. The user may select which of the points of reference at which the user can view up to a 360° FOV. This may include selecting seat locations, section locations, side-line locations, overhead locations, and/or other locations of the cameras.

The selection module 756 may be used to implement selections by a user. The selection module 756 may select a game, a channel, options, viewing parameters, an App, camera locations, points of reference, etc. The selection module 756 may generate a selection signal SLCT indicating the selections based on one or more of the signals VA, INPUT. The selection module 756 may monitor the signal INPUT and/or movement of the HMD, virtual reality device, and/or eye balls and/or the signals from the microphones 412, 512 to determine whether the user has made a certain selection. For example, if the user's head moves, a cursor displayed on the display 765 may be moved from one tile or chicklet to another tile or chicklet to select a certain sports game, App, stadium seat, stadium section, camera, point of reference, etc. The various items that may be selected may be highlighted, circled, and/or are identified in some other manner as the user's head and/or eye balls move to allow the user to make the appropriate selection. In one embodiment, when the user stops on one of the selectable items for a predetermined period of time that item is selected.

The display module 758 controls display of a virtual reality environment and other video content on the display 765. This may be based on: one or more of the signals VA, INPUT, START, SLCT, FOV from the modules 750, 752, 754, 756; signals received from the modules 760, 762; and/or signals EXTERNAL, SG, where SG is a scoreguide signal. The signal EXTERNAL may include signals with video and/or audio content, scoreguide information, statistics, menu data, etc. received from the head end 12, the user receiving device 22, the router 30, client device 34, and/or the network 50. The signal EXTERNAL and/or content and information provided in the signal EXTERNAL may be provided to any of the modules of the controller 510 and based on which the modules may perform corresponding tasks. The scoreguide signal SG is a scoreguide signal that may be generated by the scoreguide module 764 based on the signals VA, INPUT. A user may move the virtual reality device, eyeballs, and/or command viewing of an area to the left, right, up, and/or down relative to point in a center of a current FOV. Based on this, the scoreguide module 764 may display a scoreguide (sometimes referred to as a scoreboard) and/or corresponding information to the left, right up and/or down of the point in the center of the current FOV. This is further described below with respect to the method of FIG. 16.

The options module 760 may generate video content for various different options that may be displayed on the display 765 and selected by a user, as may be indicated by the selection signal SLCT. The options may include channels, tiles, games, stadium sections, stadium seats, stadium cameras, package deals, etc. The options may be offered by the content provider and/or the head end and downloaded to the upgrade module. The upgrade module 762 may generate video content for various different upgrade options that may be displayed on the display 765. The upgrades may include upgrading: stadium sections; stadium seats; locations of stadium cameras; range of angles for FOV; number of cameras; number of seats; number of sections; from video only access to video and audio access for the selected section(s), seat(s), and/or camera(s); and/or other upgrades. The upgrades may be offered by the content provider 64 and/or the head end 12 and downloaded to the upgrade module 762.

FIG. 9 shows an example of a FOV 790 displayed on a screen or display (e.g., the display 765 of FIG. 8) of a virtual reality device (e.g., the virtual reality device 36 of FIG. 6). The FOV 790 includes: a center window 800 showing a view of a currently being watched sports game; a displayed channel section 802 including tiles 804, where each of the tiles 804 shows live sports channels of other sports games and/or sports talk channels; a scoreguide 806 of the sports game displayed in the center window 800; a non-displayed channel section 808 including tiles 810, where each of the tiles 810 indicates information pertaining to a currently being played sports game that is not currently displayed in the FOV 790; and a statistic section 812. The scoreguide module 764 of FIG. 8 may generate the content shown in the scoreguide 806 and/or in the sections 808, 812. The statistic section 812 may include statistics for: the sports game and/or players and/or coaches associated with the sports game being viewed in the center window 800; other sports games, players and/or coaches; other games, players and/or coaches of a same type of sports game (football, basketball, baseball, hockey, etc.) and/or competition level of sports (e.g., professional, minor leagues, college, high school, etc.) as that being shown in the center window 800. A user may focus on and/or select one of the tiles 804 and/or tiles 810 to be displayed in the center window 800. Audio being heard may be for the game displayed in the center window 800.

The FOV 190 may also display a view within the stadium of the game shown in the center window 800. The view within the stadium may be live, a previous recorded view, a modified view or a computer generated representative view. The view may simply be a view of any stadium or of any stadium in which the type and/or competition level of the sports game shown in the center window 800 is played.

Information displayed on the scoreguide 806 and in the sections 808, 812 may be downloaded prior to and/or via a different channel than that used to download video content displayed in the section 802 and/or the center window 800. Views inside a stadium may also be downloaded prior to and/or via a different channel than that used to download video content displayed in the section 802 and/or center window 800. The views inside the stadium may be live views, previously captured views, stored representative (not actual) views of inside the stadium, and/or modified views. The information may be stored in, for example, the memory 532. This minimizes an amount of data being downloaded at any moment of time on any channel.

A user's head and/or eye balls may move to zoom in on and/or only view portions of that shown in the FOV 790. For example, the user's head and/or eye balls may move to the left and remain in that area for a predetermined period upon which time the corresponding HMD shows the tiles 804 and the center window 800 and not the scoreguide 806, tiles 810 and/or statistic section 812.

A cursor, frame or other indicator may be shown over one of the tiles 804, 810 and/or one of the tiles 804, 810 may be highlighted to indicate which of the tiles 804, 810 a user is selecting. Movement of the user's head and/or eye balls may move the indicator over a different one of the tiles 804, 810 and/or may change which one of the tiles 804, 810 are highlighted. As an example a frame 820 is shown in the section 802 and a frame 822 is shown in section 808. Moving the indicator and/or highlighting one or more tiles may also be done via the touchpad on the virtual reality device 36. Some of the tiles 808 may indicate live scores of the sports games shown in section 802. The tiles 808 may show: team trademarks, mascots, and/or symbols; which quarter or period is being played; which team has possession of the ball; records of each of the teams playing; etc. The frames 820, 822 may be for the same game or different games. In one embodiment, all of the sports games, channels, tiles, sections, scores, statistics shown in the FOV 790 are for the same type of sport and/or the same competition level of that sport.

The FOV 790 may be customizable by the user. The user may select which channels/sports games are shown in section 802, 808. The user may select: what game and/or information is shown in the center window 800; what statistics are shown in section 812; the number of channels/ games shown in section 802; whether multiple games are shown in respective windows similar to the center window and centered in a FOV by motion of the virtual reality device and/or eye balls of the user; etc.

Figure 11:
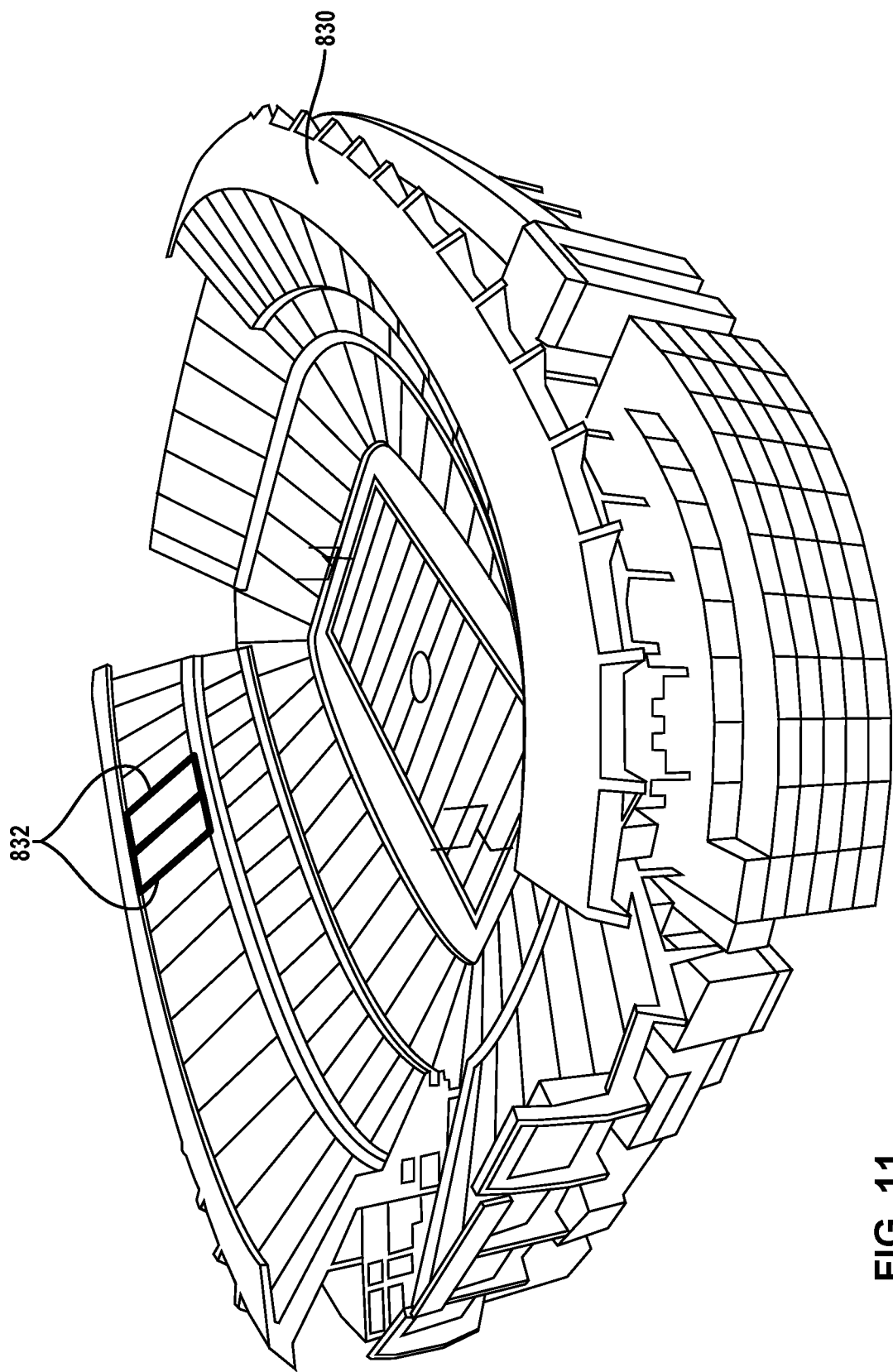
FIG. 11 is an example of a three-dimensional (3D) view of a stadium including selectable tiles as seen via the virtual reality device of FIG. 6 in accordance with the present disclosure.
Figure 12:
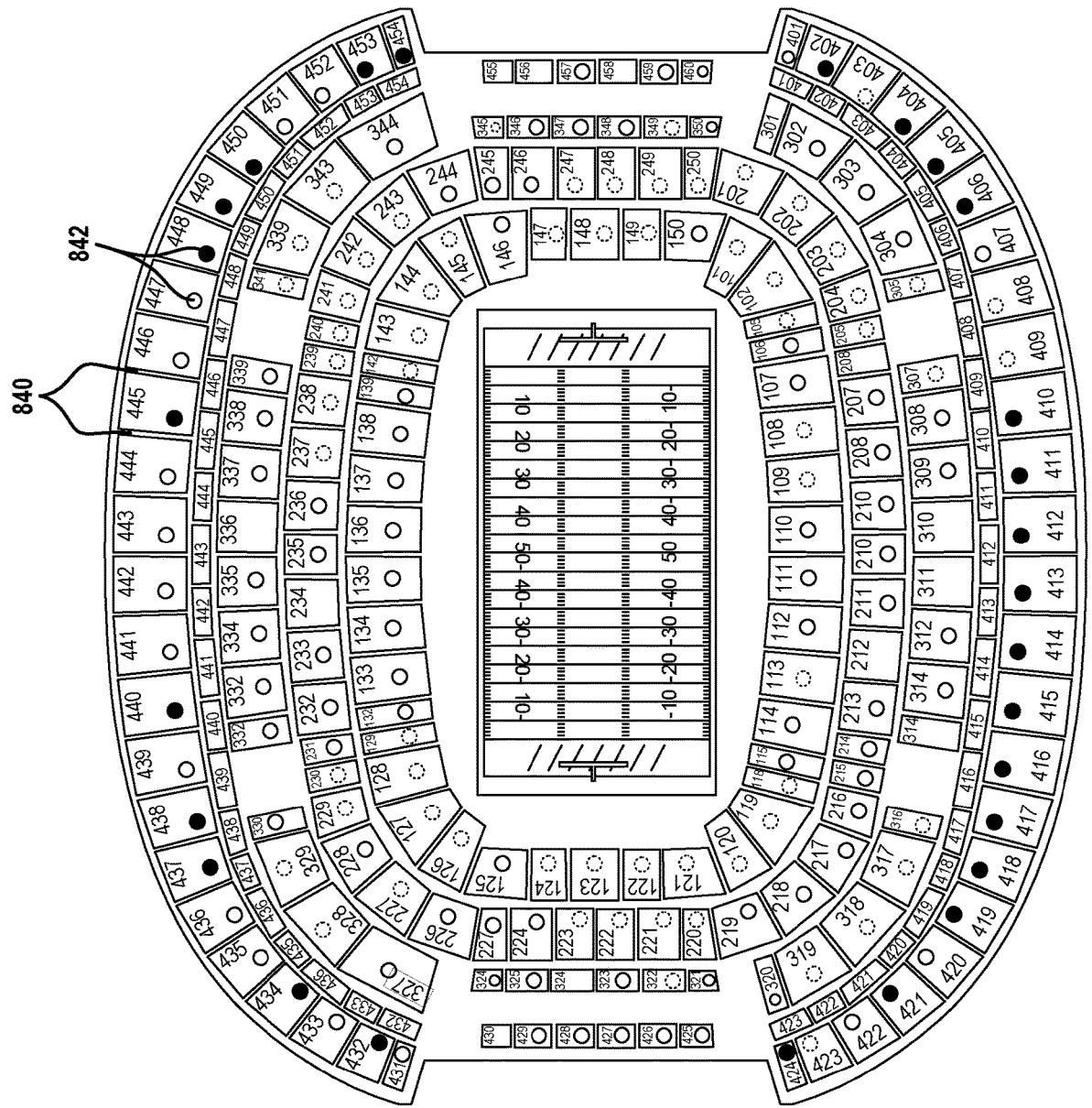
FIG. 12 is an example of a two-dimensional (2D) overhead view of selectable sections of a stadium and points of references in accordance with the present disclosure.

FIG. 11 shows an example of a three-dimensional (3D) view of a stadium 830 including selectable tiles as seen via the virtual reality device 36 and/or display 765 of FIGS. 1, 6, 8. Selectable sections 832 of the stadium 830 are outlined. A user may move the virtual reality device 36 and/or his/her eye balls to place an indicator over and/or highlight one of the sections. When a user selects a game to view, a 3D view of a stadium of the selected game may be shown to the user to allow the user to select one or more sections, seats, cameras, points of reference, etc. at or from which to view inside the stadium. FIG. 11 shows an example by which a user can select a section. FIG. 12 shows an example by which a user can select a section and/or a point of reference. Each of the points of reference refers to a location in the stadium at which one or more cameras are positioned. This allows for different 360° viewing angles. Sections 840 and points of reference 842 are shown. This allows the user to, in a virtual reality environment, experience inside the stadium at various points of reference and to move his/her head and/or eyeballs to view up to 360° at each of the points of reference.

Figure 13:
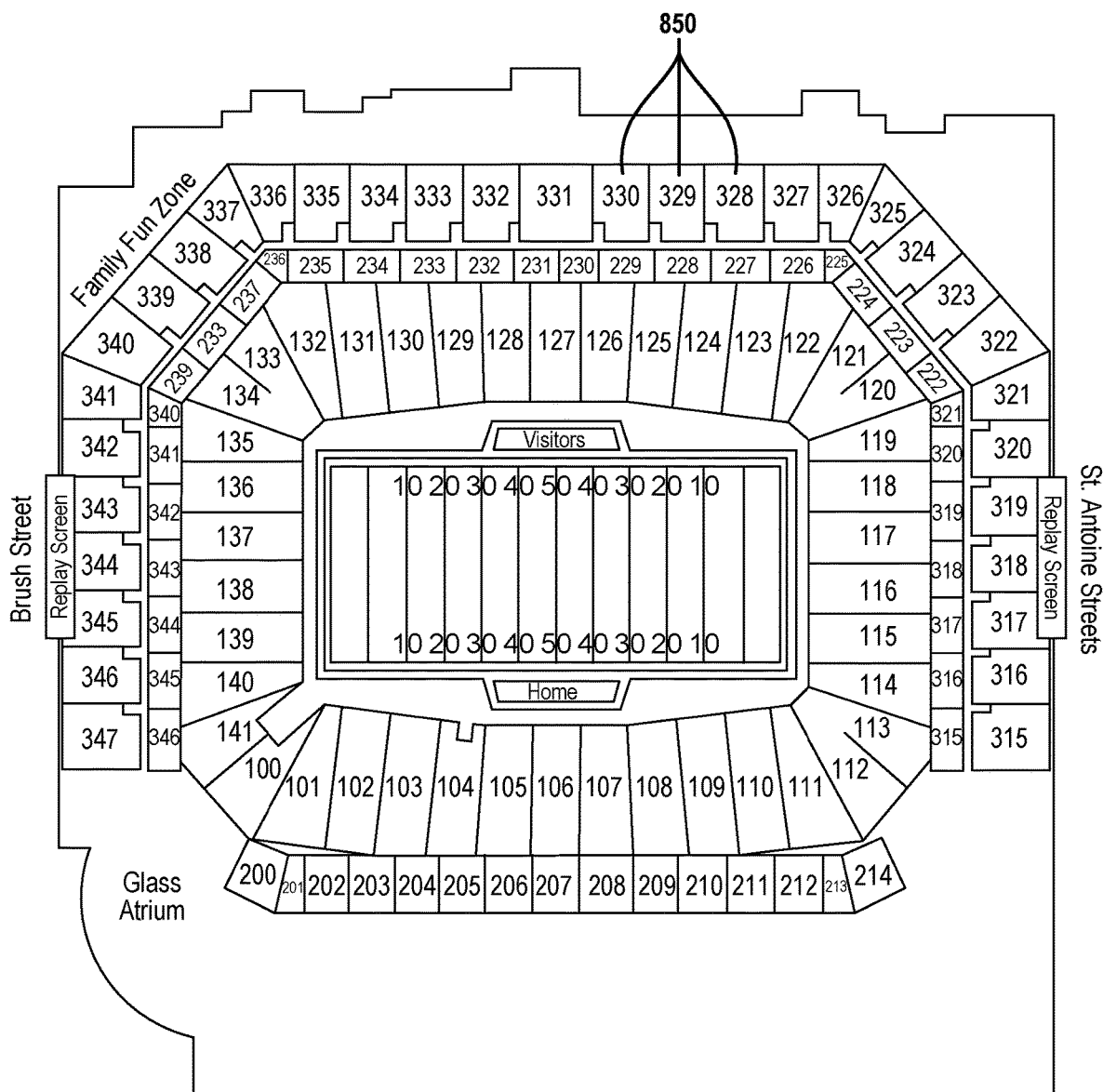
FIG. 13 is another example of a 2D overhead view of a stadium with selectable sections in accordance with the present disclosure.
Figure 14:
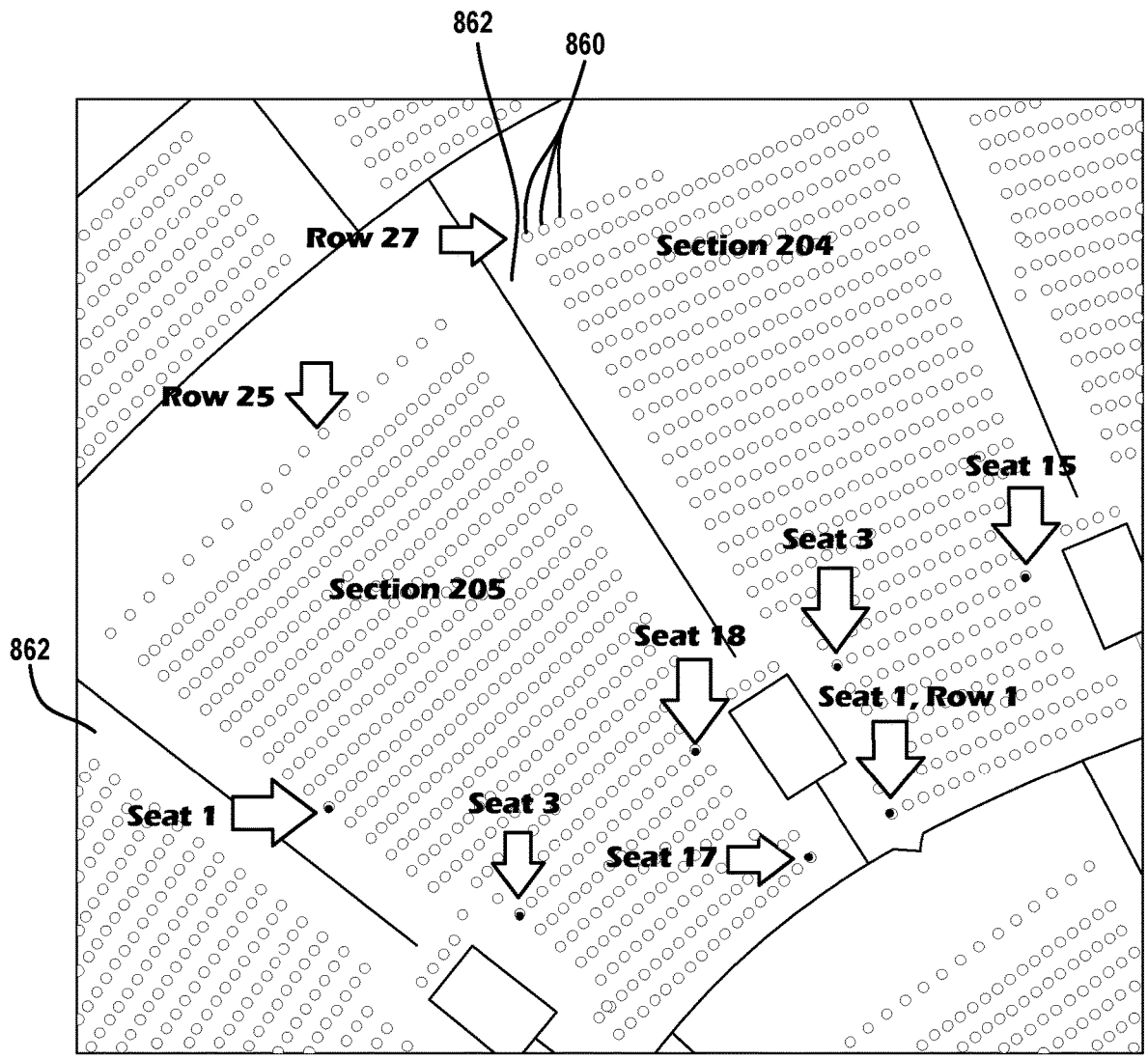
FIG. 14 is another example of a 2D overhead view of a portion of a stadium illustrating selectable seats and corresponding sections and rows in accordance with the present disclosure.

FIG. 13 is another example of a 2D overhead view of a stadium with selectable sections 850, which may be shaded and/or colored based on price range. FIG. 14 shows another example of a 2D overhead view of a portion of a stadium illustrating selectable seats 860 and corresponding sections 862 and rows. Arrows may be used to point to one or more seats at which cameras may be located to provide respective points of reference.

Price for viewing may be different depending on the section, point of reference, and locations of one or more cameras. Tiered pricing may be provided in an a la carte format, in a tiered subscription price model, and/or in some other format. For example, a user may select a baseline subscription to multiple sports events and/or a single viewing of a certain sports event and be provided with default or baseline viewing permissions. The baseline viewing permissions may allow the user to view the selected game in a high-up bleacher point of reference near, for example, an end zone of a football field. As the user upgrades his/her subscription and/or point of reference, the view may become closer and closer to the 50 yard line and/or closer to or by coaches, football players, cheerleaders and/or other team personnel. The better the location and the more features/ options selected the better the subscription package and accordingly the higher the price of the subscription package.

One or more tables may be stored in 532 of the virtual reality device 36. The tables may provide pricing for the various features, options, packages that may be selected. The tables and/or corresponding information may be displayed on the display 42 and selected by movement of the virtual reality device 36 and/or eye balls of the user, the touchpad 516, and/or the microphones 412, 512. As an example, the table(s) may include pricing for: whether one or more stationary cameras are selected; whether one or more moving cameras are selected; whether a sideline left, center or right view has been selected; which sections, seats, points of reference, and range of angles viewable at the selected points of reference are selected; whether 360° of viewing is selected; whether audio is selected; etc. Stationary cameras may refer to cameras at or near certain seats, poles, fixed structures, etc. within a stadium. Moving cameras may refer to cameras on, for example, wires and moving over a play field. A side line view may refer to a point of reference located near a sideline of the play field. This may be near a coach, a player, or other person near a side line. This may include a view from a camera located on a coach, a player or other person near a side line. The tables may include pricing for: numbers of sporting events selected; whether all games of a certain type and/or competition level are selected; number of stadiums selected; number of sections selected; number of seats selected; number of points of reference selected; whether unlimited viewing is selected; etc. The tables may include pricing for various packages including pricing for upgrades and/or promotional deals. The tables may further include pricing for: season packages; daily/monthly/yearly packages; etc. The tables may include tiered pricing of points of reference based on demand to view each game. For example, points of reference for a regular season game may be less than points of reference for a playoff game. There may be different pricing for cameras located on the playing field and/or on a player verses cameras located off of the playing field.

The tables may further include pricing for points of reference based on the number of cameras at the points of reference. Each point of reference may have any number of cameras. The larger the number of cameras, generally the better the 360° view at the corresponding point of reference.

Figure 15A:
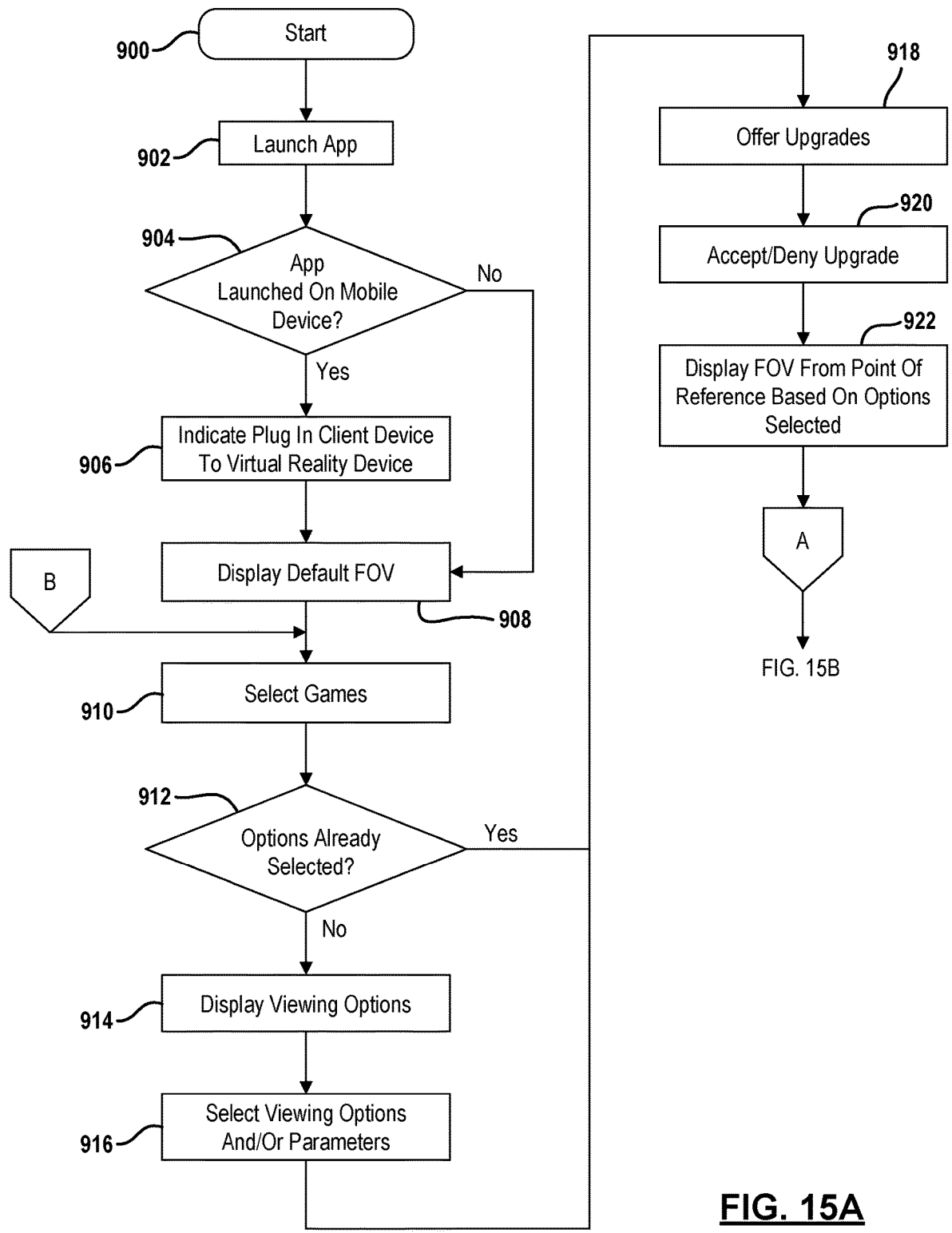
FIGS. 15A and 15B (hereinafter FIG. 15) is a flowchart of a method for controlling a virtual reality device in accordance with the present disclosure.
Figure 15B:
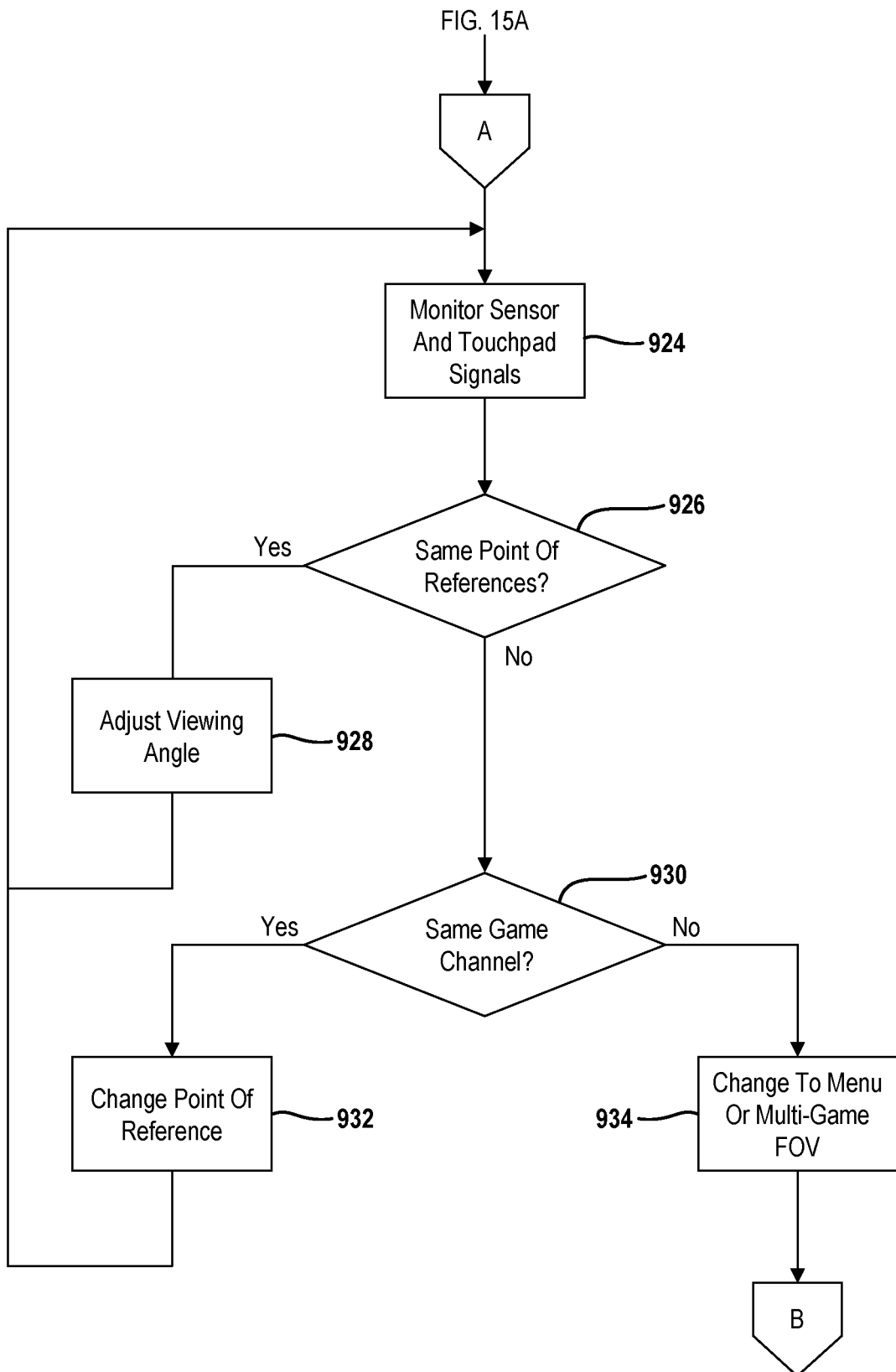
Figure 16:
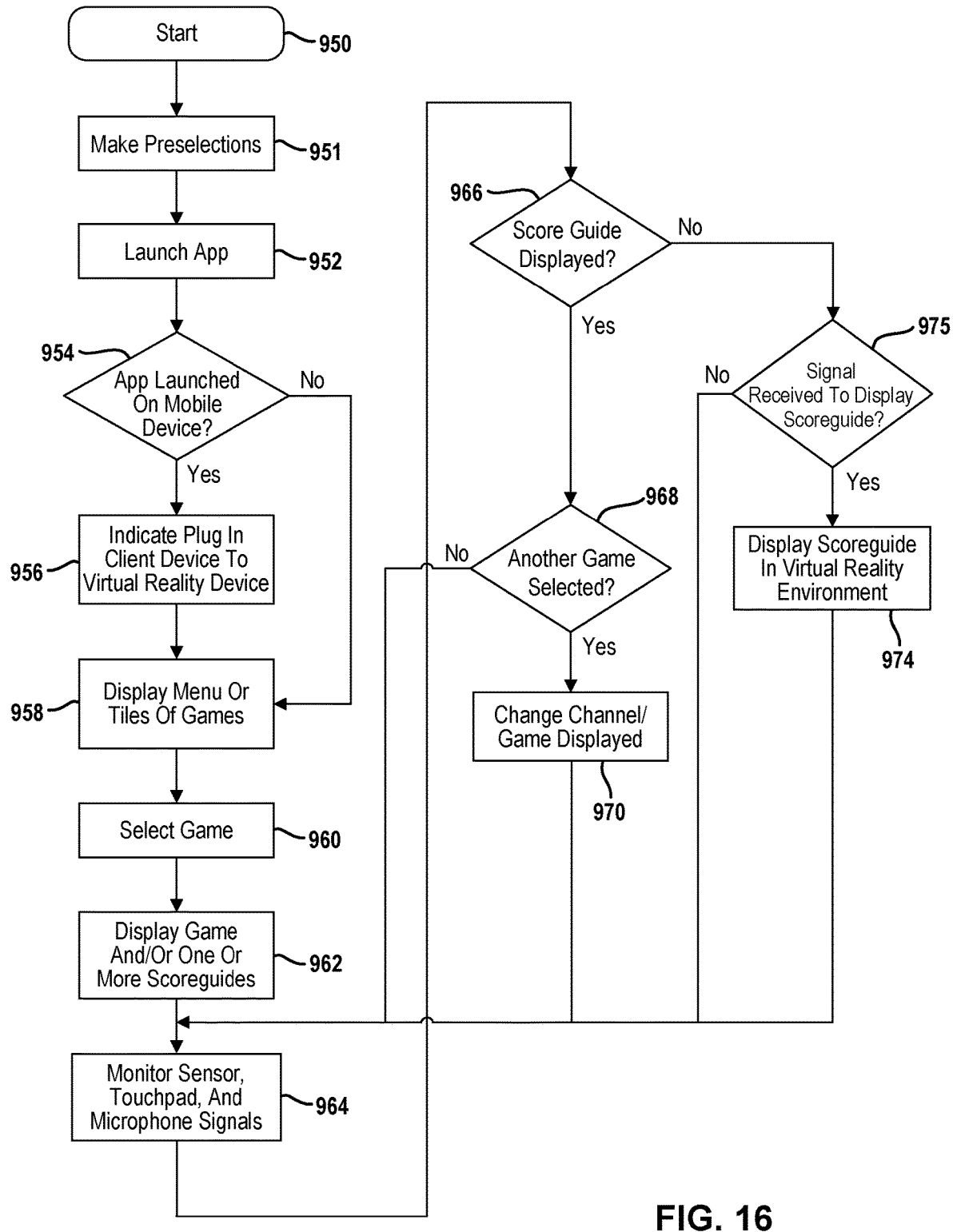
FIG. 16 is a flowchart of another method for controlling a virtual reality device in accordance with the present disclosure.

For further defined structure of the modules of FIGS. 2-5 and 7-8 see below provided methods of FIGS. 15-16 and below provided definition for the term "module". The systems disclosed herein may be operated using numerous methods, example methods are illustrated in FIGS. 15-16. FIG. 15 shows a flowchart of a method for controlling a virtual reality device (e.g., the virtual reality device 36 of FIG. 1). Although the following tasks are primarily described with respect to the implementations of FIGS. 1-14, the tasks may be easily modified to apply to other implementations of the present disclosure. The tasks may be iteratively performed. The below described tasks may be performed by modules of the controller 510.

The method may begin at 900. At 902, an App (e.g., stadium view App) is launched by the launch module 752. The App allows sporting events and stereoscopic VR channels to be stereoscopically viewed live and/or for playback using a virtual reality HMD (e.g., the virtual reality device 36). If played back, the video content may be downloaded from the head end 12 to one of the devices 22, 36, 44, 46 prior to or after selection and request of the video content by a user. If downloaded prior to the selection, the download may be based on viewing history, viewer authorization level, and/or viewing preferences of the user. The prior downloading allows for quick response time for playing the video content when selected by the user. The user may select a sports App, by selecting one of multiple tiles of Apps shown on the display 42, verbally requesting the App, or touching the touchpad 516. At 904, if the display 42 is a display of a client device (e.g., mobile device), then task 906 may be performed, otherwise task 908 may be performed.

At 906, the launch module 752 may display a message indicating to the user to connect the client device 34 to or plug the client device 34 in the virtual reality device 36. This allows a screen of the client device 34 to be used as a display for the virtual reality device 36.

In one embodiment, a FOV (e.g., the FOV 790) may be displayed on the virtual reality device at 908. As a default, a last watched sports channel or a game having a team that was last watched may be displayed. As a default, a preferred channel or game with a preferred team may be displayed. As another example, a game may be selected from a preferred type of sports game and/or competition level of the user.

At 910, a sports game may be selected other than the default sports game, as described above. This selection may be performed based on the signals from the sensors 519, the touchpad 516, the microphones 412, 512 and/or other sensors and devices on the virtual reality device 36 and receiving input from the user. At 912, display module 758 or the options module 760 may determine whether the user has already selected options for the selected sports game and has permission to view the selected game. If the options have already been selected and the user has permission, task 920 may be performed or task 918 may be performed, as shown. If the options have not already been selected, task 914 may be performed. If the options have already been selected, but the user does not have permission to view the selected game according to the options selected, the display module 758 may display a message indicating permission denied and/or show a window allowing the user to pay for the options selected.

At 914, various viewing options may be shown via the display 42. This may include showing any of the above-described tables and/or corresponding information and viewing parameters. This may include showing tiles having respective options that the user may select. The user may select and pay for the selected options if the selected options have not previously been paid. This may also include showing birds-eye views and/or other views of the stadium (e.g., the views shown in FIGS. 11-14) to allow the user to select sections, seats, cameras, and/or points of view.

At 916, one or more of the options and/or corresponding viewing parameters may be selected. This may include the sensor module 750 receiving signals from the touchpad 516, the microphones 412, 512, and/or the sensors 519 and the selection module 756 generating the selection signal SLCT, as described above. Task 918 may be performed after task 916.

In another embodiment and prior to task 908, tiles and/or a menu of current sports games are shown from which the user may select one or more to view. A selected sports game may then be shown in the center window 800 at 908.

At 918, the upgrade module 762 may generate a signal to display one or more upgrades based on the previously selected options. The upgrades may be shown in respective tiles on the display 42. At 920, the user may accept or deny one or more of the upgrades being offered.

At 922, the display module 758 displays a second FOV (stadium virtual reality FOV) from a point of reference selected for viewing. A user may switch between different points of reference if more than one point of reference has been selected and the user has permission to view the additional one or more points of reference. The switching between points of reference may be done via, for example, the touchpad 516 or by staring at a certain area within the shown FOV for a predetermined length of time.

At 924, selection module 756 and/or display module 758 monitors the sensors 519, the touchpad 516, the microphones 412, 512 and/or other sensors and device generating signals indicative of whether the user is commanding: a change of a viewing angle for a current point of reference; is commanding a change of a current point of reference to another point of reference; is commanding to switch from viewing the stadium from the current point of reference to viewing a menu or multi-game FOV (e.g., the first FOV 790); and/or is commanding some other task be performed. Task 924 may be performed throughout the method of FIG. 15.

At 926, if the point of reference is maintained, then task 928 may be performed to adjust the viewing angle for the point of reference. This may include selecting image data from different cameras at the point of reference. If the point of reference is not maintained, task 930 may be performed.

At 930, a determination is made as to whether the same sports game and/or channel is to be maintained. If the same sports game and/or channel are to be maintained, task 932 may be performed to change the point of reference. This allows the user to view the inside of the stadium for the currently watched sports game from a different point within the stadium. If the same sports game and/or channel are not to be maintained, task 934 may be performed.

At 934, the controller 510 and/or the display module 758 changes to showing a menu and/or a multi-game FOV (e.g., the FOV 790). This allows the user to select a different game, to view multiple games, and/or check statistics. Subsequent to task 934, task 910 may be performed.

The above-described tasks are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The above-described examples allow a user to watch sporting events via an immersive virtual reality HMD. The user is able to view a virtual reality environment in which the user is able to view inside the stadium as if the user were at a point of reference within the stadium. The user can have a 360° view from a selected point of reference, as well as be able to look upward (allowing the user to look at higher seats, a scoreboard, and/or ceiling of the stadium) and/or downward (allowing the user to look at lower seats, sideline areas, end zones, playing field, rink, court, etc. This benefits consumers with disabilities that may not be able to physically go to the stadium and/or travel by providing exclusive camera angles of a sporting event (e.g., national football league (NFL®) Sunday Ticket by DIRECTV® content). Video content of sports channels (e.g., Red Zone Channel®, DIRECTV Fantasy Zone Channel™) may also be viewed in a virtual reality environment.

FIG. 16 shows a flowchart of a method for controlling a virtual reality device (e.g., the virtual reality device 36 of FIG. 1). Although the following tasks are primarily described with respect to the implementations of FIGS. 1-14, the tasks may be easily modified to apply to other implementations of the present disclosure. The tasks may be iteratively performed. The below described tasks may be performed by modules of the controller 510.

The method may begin at 950. At 951, a user may preselect teams, games, sports events, cities, regions, sports channels, types of sports, competition levels, number of channels to display, etc. via the client device 34 (e.g., mobile phone). This may include configuring layouts of one or more scoreguides. This may include selecting and launching an App on the client device 34, receiving the user's selection as an input, and forwarding the selections to the head end 12 and the virtual reality device 36.

At 952, an App (e.g., stadium view App or scoreguide view App) is launched by the launch module 752. The App allows sporting events and stereoscopic VR channels to be to be stereoscopically viewed live and/or for playback using a virtual reality HMD (e.g., the virtual reality device 36). The stadium view App allows a user to look to the left, right, up and/or down to view a scoreguide. The scoreguide may include: a score of a current game being watched; sports information pertaining to the current game being watched; tiles with sports information for other currently being played games; scores of other games previous played; statistics; etc. The sports information may include: trademarks, symbols, and/or mascots of the teams playing in the current game; records of the teams playing in the current game; an indication of the team having possession of the ball or puck; a current down; time remaining in a current quarter or period; yards to go to first down; penalties; timeouts remaining; etc.

Figure 17:
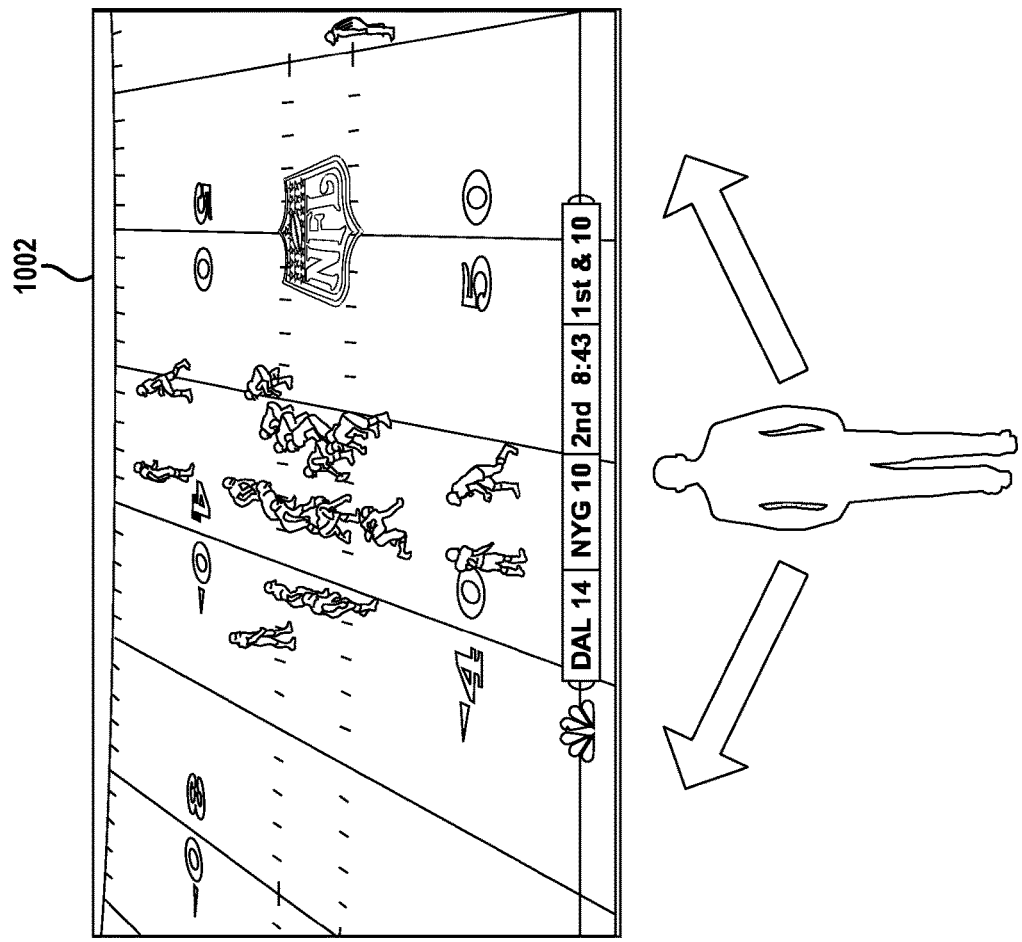
FIG. 17 is an example of another field-of-view displayed on the screen of the virtual reality device of FIG. 6 in accordance with the present disclosure.

FIG. 17 shows an example of a field of view 1000 showing a center window 1002, and two scoreguides 1004, 1006, which are on left and right sides of the center window 1002. The center window 1002 displays the current game being watched. In one embodiment, the scoreguides 1004, 1006 are not shown unless the user looks to the left or the right. If the user looks to the left, the scoreguide 1004 and/or the center window 1000 are shown. If the user looks to the right, the scoreguide 1006 and/or the center window 1000 are shown. The scoreguides 1004, 1006 may be shown directly to the left or to the right or may be offset vertically from the center window 1000, as shown. Although FIG. 17 shows scoreguides to the left and right of the center window 1000, scoreguides may be shown above or below the center window 1000. This may occur when the user looks above or below the center window 1000.

If played back, the video content may be downloaded from the head end 12 to one of the devices 22, 36, 44, 46 prior to or after selection and request of the video content by a user. If downloaded prior to the selection, the download may be based on viewing history and viewing preferences of the user. The prior downloading allows for quick response time for playing the video content when selected by the user. The user may select a sports App, by selecting one of multiple tiles of Apps shown on the display 42, verbally requesting the App, or touching the touchpad 516. At 954, if the display 42 is a display of a client device (e.g., mobile device), then task 956 may be performed, otherwise task 958 may be performed.

Referring again to FIG. 16, at 956, the launch module 752 may display a message indicating to the user to connect the client device 34 to or plug the client device 34 in the virtual reality device 36. This allows a screen of the client device 34 to be used as a display for the virtual reality device 36.

In one embodiment, a first FOV (e.g., the FOV 1000) or a portion thereof may be displayed on the virtual reality device at 958. As an alternative, a FOV including a menu or array of tiles of selectable games may be displayed, as stated in FIG. 16. If the FOV 1000 is displayed, then a game may be displayed based on the preselections obtained at 951. As an alternative, a default, a last watched sports channel, a last watched game, and/or a game having a team that was last watched may be displayed. As a default, a preferred channel or game with a preferred team may be displayed. As another example, a game may be selected from a preferred type of sports game and/or competition level of the user. If however the menu or array of tiles of selectable games is displayed, then multiple boxes or chicklets may be displayed that respectively indicate information regarding current games being played, such as team names, types of sporting event, team logos, trademarks, symbols, mascots, scores, and/or other information pertaining to the corresponding game. The tiles may be similar to the tiles in the section 808 of FIG. 9.

At 960, a sports game may be selected other than the sports game displayed at 958. This selection may be performed based on the signals from the sensors 519, the touchpad 516, the microphones 412, 512 and/or other sensors and devices on the virtual reality device 36 and receiving input from the user. As another selection example, a user may tap and hold a button on the virtual reality device 36 to make a selection. As another selection example, a user may hover over a displayed tile with the user's eyes to select the tile. A user may select a tile and drag the tile around a FOV to select where a game is to be displayed in the FOV. Also, the selections disclosed herein may be based on signals from one or more of the sensors 519, the touchpad 516, the microphones 412, 512 and/or other sensors and devices on the virtual reality device 36. Thus, a single selection may be based on a combination of signals from different ones of these devices.

At 962, the display module 758 displays a second FOV (e.g., the FOV 1000, which may be referred to as a stadium virtual reality FOV). The second field of view may include a center window (e.g., the center window 1002) and one or more scoreguides (e.g., the scoreguides 1004, 1006). The second FOV 1000 may show the game as would be seen on a television (e.g., 2D view of a game as provided by a sports channel) or may show the game from a point of reference within a stadium of the game selected for viewing, as described above. A user may switch between different points of reference if more than one point of reference has been selected and the user has permission to view the additional one or more points of reference, as also described above. The scoreguides may be displayed to the left, right, above or underneath the center window and may be displayed based on outputs of the sensors 519, the touchpad 516, the microphones 412, 512 and/or other sensors and devices on the virtual reality device 36 and receiving input from the user.

This is different than pressing a button on a remote control to launch a scoreguide on a television. As a default, one or more scoreguides or no scoreguides may be shown as a default. Display of multiple scoreguides may be referred to as a stereoscopic conversion and display of a scoreguide. The scoreguides may be moved around and/or tiles within each of the scoreguides may be moved around within the virtual reality environment to provide a custom layout. If more than one scoreguide is displayed, the scoreguides may include the same or different tiles, information, etc.

At 964, the signals from the sensors 519, the touchpad 516, the microphones 412, 512 and/or other sensors and devices on the virtual reality device 36 and receiving input from the user are monitored. Task 964 may be performed more than once and at any point during the method of FIG. 16.

At 966, based on the input from the user, the scoreguide module 764 or the display module 758 determines whether a scoreguide is displayed. If a scoreguide is displayed, task 968 may be performed, otherwise task 972 may be performed.

At 968, the selection module 756 or the display module 758 determines whether another game is selected. If another game is selected, task 970 may be performed, otherwise task 964 may be performed.

At 970, the display module 758 changes a channel and/or game being displayed on the display 765 of the virtual reality device 36. At 972, the selection module 756 or the display module 758 may determine if a signal from the sensors 519, the touchpad 516, the microphones 412, 512 and/or other sensors and devices on the virtual reality device 36 has been receive to display a scoreguide. The selection module 756 or the display module 758 may also determine if a signal (e.g., the signal EXTERNAL) has been received with content for a scoreguide. If the signals have been received, task 974 may be performed to display a scoreguide. Task 964 may be performed subsequent to task 972 if the signals have not been received. Subsequent to displaying a scoreguide, the user may return to directly looking at the center window of the game. At this point the scoreguide may no longer be displayed.

The above-described method allows users to check scores via interactive service items (e.g., game chips/tiles and/or scoreguide) in comfort of their own home via a HMD by simply looking in a particular direct in which the users want to see the interactive service items. The scoreguide allows a user to check their favorite team's score without having a portion of a view of a game covered by the scoreguide. The user can look in a particular direction relative to the view of the game to view the scoreguide and/or select other games and/or sports channels. This allows a view of the current game to continue being displayed and enables the user to view additional sports scores.

The images displayed during the above-described methods may be updated periodically. This includes images of games, scoreguides, stadiums and/or other displayed images. A refresh rate of the images associated with a game and/or playing field may be faster than a refresh rate associated with a scoreguide and/or or a view inside a stadium that does not include a playing field.

The above-described methods are applicable to any virtual reality platform used to display sports channels and/or events. Some examples of sports channels that may be displayed are NBA League Pass™, NFL Sunday Ticket™, MLB Extra Inning™, and NHL Center Ice™.

The wireless communications described in the present disclosure can be conducted in full or partial compliance with IEEE standards, such as IEEE standard 802.11-2012, IEEE standard 802.16-2009, IEEE standard 802.20-2008 and/or other suitable IEEE standards. In various implementations, IEEE 802.11-2012 may be supplemented by draft IEEE standard 802.11ac, draft IEEE standard 802.11ad, and/or draft IEEE standard 802.11ah.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

As used herein, the phrase at least one of A, B, and C should be construed to mean a logical (A OR B OR C), using a non-exclusive logical OR, and should not be construed to mean "at least one of A, at least one of B, and at least one of C."

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip. Each module may include and/or be implemented as a computing device, which may be implemented in analog circuitry and/or digital circuitry. Further, the computing device may include a microprocessor or microcontroller that performs instructions to carry out steps performed by various system components.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc). The computer-readable medium and/or memory disclosed herein may include, for example, a hard drive, Flash memory, radon access memory (RAM), programmable read only memory (PROM), electrically erasable programmable read only memory (EEPROM), read only memory (ROM) phase-change memory and/or other discrete memory components.

In this application, apparatus elements described as having particular attributes or performing particular operations are specifically configured to have those particular attributes and perform those particular operations. Specifically, a description of an element to perform an action means that the element is configured to perform the action. The configuration of an element includes providing the hardware and optionally the software to perform the corresponding action in addition to the hardware provided. Examples of the structure that may be used to perform the corresponding action are provided throughout the specification and illustrated by the provided drawings. See the examples of the defined structure disclosed by the modules, devices, elements and corresponding methods described herein. The configuration of an element may include programming of the element, such as by encoding instructions on a non-transitory, tangible computer-readable medium associated with the element.

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A method, comprising:
   presenting, by a virtual reality system, video content in a center window of a virtual reality display of a head-mounted device according to a first point of reference of a plurality of points of reference associated with live channel playback;
   generating, by the virtual reality system, a plurality of head-mounted display movement signals based on detection of at least one of movement of the head-mounted device or movement of an eyeball of a user;
   presenting, by the virtual reality system, data tiles left, right, above or below the center window of the virtual reality display of the head-mounted device by shifting the center window in a direction within the virtual reality display in response to detection of a first head-mounted display movement signal of the plurality of head-mounted display movement signals;
   selecting, by the virtual reality system, a second point of reference of the plurality of points of reference for the live channel playback in response to detection of a second head-mounted display movement signal of the plurality of head-mounted display movement signals; and
   presenting, by the virtual reality system, the video content in the center window of the virtual reality display according to the selecting of the second point of reference of the plurality of points of reference for the live channel playback.

2. The method of claim 1, further comprising detecting, by the virtual reality system, a first head-mounted display movement signal of the plurality of head-mounted display movement signals.

3. The method of claim 2, further comprising selecting, by the virtual reality system, the first point of reference of the plurality of points of reference associated with the live channel playback in response to the detecting the first head-mounted display movement signal of the plurality of head-mounted display movement signals.

4. The method of claim 1, wherein the presenting the data tiles further comprises displaying sports scores.

5. The method of claim 1, further comprising generating, by the virtual reality system, a scoreguide comprising the data tiles based on the plurality of head-mounted display movement signals.

6. The method of claim 5, further comprising changing, by the virtual reality system, a layout of the scoreguide as shown in the virtual reality display based on the plurality of head mounted display movement signals.

7. The method claim 5, wherein each of the data tiles further includes at least one identifier, and wherein each of the identifiers of the data tiles correspond to a respective sports game, sports event, or sports channel.

8. The method of claim 7, wherein each of the data tiles further includes a live score of the respective sports game.

9. The method of claim 1, wherein the presenting the data tiles further comprises displaying live sporting events.

10. The method of claim 9, wherein the live sporting events are related to the video content in the center window.

11. The method of claim 1, wherein the data tiles are related to the video content in the center window.

12. A non-transitory machine-readable storage medium, comprising instructions, wherein responsive to executing the instructions, a processor of a virtual reality system performs operations comprising:
 presenting video content in a center window of a virtual reality display of a head-mounted device according to a first point of reference of a plurality of points of reference associated with live channel playback;
 presenting data tiles left, right, above or below the center window of the virtual reality display of the head-mounted device by shifting the center window in a direction within the virtual reality display according to detection of a first head-mounted display movement signal of a plurality of head-mounted display movement signals;
 selecting a second point of reference of the plurality of points of reference for the live channel playback in response to detection of a second head-mounted display movement signal of the plurality of head-mounted display movement signals; and
 presenting the video content in the center window of the virtual reality display according to the selecting of the second point of reference of the plurality of points of reference for the live channel playback.

13. The non-transitory machine-readable storage medium of claim 12, wherein the operations further comprise generating the plurality of head-mounted display movement signals based on detection of at least one of movement of the head-mounted device or movement of an eyeball of a user.

14. The non-transitory machine-readable storage medium of claim 12, wherein the operations further comprise detecting the first head-mounted display movement signal of the plurality of head-mounted display movement signals.

15. The non-transitory machine-readable storage medium of claim 14, wherein the operations further comprise selecting the first point of reference of the plurality of points of reference associated with the live channel playback in response to the detecting the first head-mounted display movement signal of the plurality of head-mounted display movement signals.

16. The non-transitory machine-readable storage medium of claim 12 wherein the operations further comprise:
 generating a scoreguide comprising the data tiles based on the plurality of head-mounted display movement signals; and
 changing a layout of the scoreguide as shown in the virtual reality display based on the plurality of head mounted display movement signals.

17. The non-transitory machine-readable storage medium of claim 16 wherein each of the data tiles further includes at least one identifier, and wherein each of the identifiers of the data tiles correspond to a respective sports game, sports event, or sports channel.

18. A virtual reality apparatus, comprising:
 a memory to store instructions; and
 a processor coupled to the memory, wherein responsive to executing the instructions, the processor facilitates a performance of operations, the operations comprising:
 selecting a first point of reference of a plurality of points of reference associated with live channel playback in response to detecting a first head-mounted display movement signal of a plurality of head-mounted display movement signals
 presenting video content in a center window of a virtual reality display of a head-mounted device according to the first point of reference of the plurality of points of reference associated with the live channel playback;
 presenting data tiles left, right, above or below the center window of the virtual reality display of the head-mounted device by shifting the center window in a direction within the virtual reality display according to detection of a second head-mounted display movement signal of the plurality of head-mounted display movement signals; and
 presenting the video content in the center window of the virtual reality display according to a selection of a second point of reference of the plurality of points of reference for the live channel playback.

19. The virtual reality apparatus of claim 18, wherein the operations further comprise selecting the second point of reference of the plurality of points of reference for the live channel playback in response to the detection of the second head-mounted display movement signal of the plurality of head-mounted display movement signals.

20. The virtual reality apparatus of claim 18, wherein the operations further comprise generating the plurality of head-mounted display movement signals based on detection of at least one of movement of the head-mounted device or movement of an eyeball of a user.

* * * * *